(12) United States Patent
Hodgkins et al.

(10) Patent No.: US 11,958,751 B2
(45) Date of Patent: Apr. 16, 2024

(54) METHOD OF SYNTHESIZING MATERIALS INTEGRATING SUPERNATANT RECYCLE

(71) Applicant: Saudi Arabian Oil Company, Dhahran (SA)

(72) Inventors: Robert P. Hodgkins, Dhahran (SA); Omer Refa Koseoglu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/850,285

(22) Filed: Jun. 27, 2022

(65) Prior Publication Data

US 2023/0416101 A1 Dec. 28, 2023

(51) Int. Cl.
*C01B 39/38* (2006.01)

(52) U.S. Cl.
CPC .................. *C01B 39/38* (2013.01)

(58) Field of Classification Search
None
See application file for complete search history.

(56) References Cited

U.S. PATENT DOCUMENTS

| | | | |
|---|---|---|---|
| 3,313,594 A | 4/1967 | Wilson | |
| 3,516,786 A | 6/1970 | Maher et al. | |
| 3,556,725 A | 1/1971 | Chiola et al. | |
| 5,637,287 A | 6/1997 | Vaughan et al. | |
| 5,763,720 A | 6/1998 | Buchanan et al. | |
| 5,951,962 A | 9/1999 | Müller et al. | |
| 6,337,063 B1 | 1/2002 | Rouleau et al. | |
| 7,923,522 B2 | 4/2011 | Hamada et al. | |
| 10,781,168 B2 | 9/2020 | Koseoglu et al. | |
| 10,793,782 B2 | 10/2020 | Koseoglu et al. | |
| 10,807,947 B2 | 10/2020 | Koseoglu et al. | |
| 10,927,318 B2 | 2/2021 | Koseoglu et al. | |
| 11,014,821 B2 | 5/2021 | Lang | |
| 11,111,212 B2 | 9/2021 | Koseoglu et al. | |

FOREIGN PATENT DOCUMENTS

| | | | |
|---|---|---|---|
| CN | 102452663 A | | 5/2012 |
| CN | 103055933 A | | 4/2013 |
| CN | 106145134 A | | 11/2016 |
| CN | 105330605 | * | 2/2017 |
| CN | 107982540 A | | 5/2018 |
| EP | 0999183 B1 | | 6/2003 |
| WO | 2018005865 | * | 1/2018 |
| WO | 2018202468 A1 | | 11/2018 |

OTHER PUBLICATIONS

Grabicka et al. "Microwave-assisted synthesis of periodic mesoporous organosilicas with ethane and disulfide groups." Microporous and Mesoporous Materials 119.1-3 (2009): 144-149.

Jin et al. "Gold nanoparticles stabilized in a novel periodic mesoporous organosilica of SBA-15 for styrene epoxidation." Microporous and Mesoporous Materials 111.1-3 (2008): 569-576.

Jo et al. "Synthesis of Silicate Zeolite Analogues Using Organic Sulfonium Compounds as Structure-Directing Agents." Angewandte Chemie International Edition 54.43 (2015). Wiley Online Library, 12996-12999. 14 total pages.

Keshavarz et al. "Impact of Mother Liquor Recycle on the Impurity Buildup in Crystallization Processes." Organic Process Research & Development 22.11 (2018): 1541-1547.

Smith. "A model for mother liquor recycle in batch processing." Organic Process Research & Development 1.2 (1997): 165-167.

* cited by examiner

*Primary Examiner* — Sheng H Davis
(74) *Attorney, Agent, or Firm* — Leason Ellis LLP

(57) ABSTRACT

Methods are disclosed for synthesizing materials, including an initial synthesis in the presence of WS-ODSO (which can include a pH-modified WS-ODSO composition, in certain embodiments a neutralized WS-ODSO composition), and one or more subsequent syntheses using supernatant ("mother liquor") from a previous synthesis of the same or different materials. The synthesized materials in the initial synthesis and in subsequent synthesis can be the same or different inorganic oxide materials including amorphous oxides, crystalline oxides or oxides of metals. The methods advantageously reduce the amount of utility water required for synthesizing a material and reduce the water waste, and reduce the DSO waste from a refinery and discharge into the environment. In certain embodiments the methods reduce the requirements to procure an alkaline reagent required for synthesizing materials. In certain embodiments, supernatant can be recycled over multiple synthesis batches of the same or different type of material.

28 Claims, 8 Drawing Sheets

METHOD OF SYNTHESIZING MATERIALS INTEGRATING SUPERNATANT RECYCLE

FIELD OF THE DISCLOSURE

The present disclosure relates to method of synthesizing zeolites.

BACKGROUND OF THE DISCLOSURE

Zeolites

Zeolites are crystalline alumino-silicate solids possessing well-defined structures and uniform pore sizes that can be measured in angstroms (Å). Typically, zeolites comprise framework atoms such as silicon, aluminum and oxygen arranged as silica and alumina tetrahedra. Zeolites are generally hydrated aluminum silicates that can be made or selected with a controlled porosity and other characteristics, and typically contain cations, water and/or other molecules located in the porous network. Hundreds of natural and synthetic zeolite framework types exist with a wide range of applications. Numerous zeolites occur naturally and are extensively mined, whereas a wealth of interdependent research has resulted in an abundance of synthetic zeolites of different structures and compositions. The unique properties of zeolites and the ability to tailor zeolites for specific applications has resulted in the extensive use of zeolites in industry as catalysts, molecular sieves, adsorbents, ion exchange materials and for the separation of gases. Certain types of zeolites find application in various processes in petroleum refineries and many other applications. The zeolite pores can form sites for catalytic reactions, and can also form channels that are selective for the passage of certain compounds and/or isomers to the exclusion of others. Zeolites can also possess an acidity level that enhances its efficacy as a catalytic material or adsorbent, alone or with the addition of active components.

Aluminosilicate zeolites are typically synthesized via hydrothermal means from which zeolite crystals precipitate from a gel, using water as a solvent. The aluminosilicate zeolite comprises repeating unit cells as its framework comprising silicon, aluminum and oxygen. When trivalent Al substitutes for tetrahedral silica in the framework a negative charge is induced that is counter-balanced by a cation, typically an alkali metal such as $Na^+$. In order for the zeolite to exhibit acidity the sodium cation should be replaced with a proton. The proton associated with counter-balancing the negative charge derived from the framework aluminum results in a Brønsted acid site. Lewis acidity typically results from extra-framework aluminum.

Zeolite-type materials include crystalline silicates with various heteroatoms other than aluminum, such as germanium, gallium, boron, and zinc, along with zeolite-type materials such as crystalline silico-alumino-phosphate (SAPO) or alumino-phosphate (AlPO) materials. When these materials have crystalline porous structures such as zeolites, they are known as molecular sieves.

Sol-gel hydrothermal routes are the most conventional and widely applied methods for synthesizing zeolites and zeolite-type materials. In general, hydrothermal synthesis combines material precursors, reagents and optionally structure directing or templating agents, in an effective amount of water, and high temperature reaction to precipitate solids in a mother liquor. Effective amounts and proportions of precursors and reagents are formed as a homogeneous aqueous mixture. For example, in zeolite synthesis a homogeneous aqueous mixture includes a water source, an aluminum source, a silica source, an alkali metal source, and an optional structure directing agent. The components are mixed for an effective time and under conditions suitable to form the homogeneous aqueous mixture. The homogeneous aqueous mixture is heated under conditions and for a time effective to form a precipitate (product) suspended in a supernatant (mother liquor). The precipitate is recovered, for example by filtration, washing and drying. The eventual framework of the as-made zeolites depends on various factors including but not limited to the time and/or temperature of hydrothermal reaction; selected structure directing agents (if any); selected seeds; and/or selected mineralizer. In certain synthesis routes, the recovered precipitate is calcined at a suitable temperature, temperature ramp rate and for a suitable period of time, for example to increase porosity and/or remove structure directing agent that remain in the precipitate.

Within a typical refinery, there are by-product streams that must be treated or otherwise disposed of. The mercaptan oxidation process, commonly referred to as the MEROX process, has long been employed for the removal of the generally foul smelling mercaptans found in many hydrocarbon streams and was introduced in the refining industry over fifty years ago. Because of regulatory requirements for the reduction of the sulfur content of fuels for environmental reasons, refineries have been, and continue to be faced with the disposal of large volumes of sulfur-containing by-products. Disulfide oil (DSO) compounds are produced as a by-product of the MEROX process in which the mercaptans are removed from any of a variety of petroleum streams including liquefied petroleum gas, naphtha, and other hydrocarbon fractions. It is commonly referred to as a 'sweetening process' because it removes the sour or foul smelling mercaptans present in crude petroleum. The term "DSO" is used for convenience in this description and in the claims, and will be understood to include the mixture of disulfide oils produced as by-products of the mercaptan oxidation process. Examples of DSO include dimethyldisulfide, diethyldisulfide, and methylethyldisulfide.

The by-product DSO compounds produced by the MEROX unit can be processed and/or disposed of during the operation of various other refinery units. For example, DSO can be added to the fuel oil pool at the expense of a resulting higher sulfur content of the pool. DSO can be processed in a hydrotreating/hydrocracking unit at the expense of higher hydrogen consumption. DSO also has an unpleasant foul or sour smell, which is somewhat less prevalent because of its relatively lower vapor pressure at ambient temperature; however, problems exist in the handling of this oil.

Commonly owned U.S. Pat. No. 10,807,947 which is incorporated by reference herein in its entirety discloses a controlled catalytic oxidation of MEROX process by-products DSO. The resulting oxidized material is referred to as oxidized disulfide oil (ODSO). As disclosed in U.S. Pat. No. 10,807,947, the by-product DSO compounds from the mercaptan oxidation process can be oxidized, in the presence of a catalyst. The oxidation reaction products constitute an abundant source of ODSO compounds, sulfoxides, sulfonates, sulfinates and sulfones.

The ODSO stream so-produced contains ODSO compounds as disclosed in U.S. Pat. Nos. 10,781,168 and 11,111,212 as compositions (such as a solvent), in U.S. Pat. No. 10,793,782 as an aromatics extraction solvent, and in U.S. Pat. No. 10,927,318 as a lubricity additive, all of which are incorporated by reference herein in their entireties. In the event that a refiner has produced or has on hand an amount of DSO compounds that is in excess of foreseeable needs for these or other uses, the refiner may wish to dispose of the DSO compounds in order to clear a storage vessel and/or eliminate the product from inventory for tax reasons.

Thus, there is a clear and long-standing need to provide an efficient and economical process for the treatment of the large volumes of DSO by-products and their derivatives to effect and modify their properties in order to facilitate and simplify their environmentally acceptable disposal, and to utilize the modified products in an economically and environmentally friendly manner, and thereby enhance the value of this class of by-products to the refiner.

In regard to the above background information, the present disclosure is directed to provide a technical solution for a method to synthesize materials using a supernatant across multiple syntheses.

SUMMARY OF THE DISCLOSURE

In an embodiment, a method for synthesis of a material is provided. The method generally comprises: heating a homogeneous aqueous mixture of one or more water-soluble oxidized disulfide oil (WS-ODSO) compounds, and precursors and reagents, for a first synthesis of a first material, under conditions and for a time effective to form the first material as a first precipitate suspended in a first supernatant; separating all or a portion of the first precipitate from the first supernatant; and using all or a portion of the first supernatant in a second synthesis of a same, similar or different type of material. In certain embodiments, using all or a portion of the first supernatant in the second synthesis comprises: forming a second homogeneous aqueous mixture of all or a portion of the first supernatant, and precursors and reagents for the second synthesis, and heating the second homogeneous aqueous mixture under conditions and for a time effective to form zeolite or zeolite-type materials as a second precipitate suspended in a second supernatant. In certain embodiments, make-up WS-ODSO is added with precursors and reagents for the second synthesis. In certain embodiments, the process further comprised carrying out an Nth synthesis of a same, similar or different type of material, wherein N≥3, the wherein the Nth synthesis comprises: forming an Nth homogeneous aqueous mixture of all or a portion of the second supernatant if N=3, or all or a portion of an (N−1)th supernatant if N>3, and precursors and reagents for the Nth synthesis, and heating the Nth homogeneous aqueous mixture under conditions and for a time effective to form an Nth material as an Nth precipitate suspended in an Nth supernatant. In certain embodiments, make-up WS-ODSO is added with precursors and reagents for the Nth synthesis. In certain embodiments, the Nth supernatant is used as a component in a subsequent (N+1)th synthesis.

In an embodiment, a method for synthesis of a material is provided. The method generally comprises: carrying out a first synthesis of a first material in the presence of one or more water-soluble oxidized disulfide oil (WS-ODSO) compounds to form the first material as a first precipitate suspended in a first supernatant; separating all or a portion of the first precipitate from the first supernatant; and carrying out an Nth synthesis of a same, similar or different type of material, wherein N is an integer greater than or equal to 2, and wherein the Nth synthesis uses supernatant from an (N−X)th synthesis, wherein X is an integer between 1 and (N−1).

In certain of the above embodiments, the one or more WS-ODSO compounds are provided as a pH-modified WS-ODSO composition of an acidic WS-ODSO composition and an alkaline agent. In certain of the above embodiments in which make-up WS-ODSO is added, make-up WS-ODSO comprises a pH-modified WS-ODSO composition of an acidic WS-ODSO composition and an alkaline agent. In certain of the above embodiments, the WS-ODSO one or more WS-ODSO compounds are provided as a pH-modified WS-ODSO composition of an acidic WS-ODSO composition and an alkaline agent, and wherein the first supernatant comprises the alkaline agent as all or a portion of mineralizer required for the second synthesis. In certain of the above embodiments, the first supernatant serves as a portion of water required for the second synthesis or as all utility water required for the second synthesis. In certain of the above embodiments, the one or more WS-ODSO compounds are provided as a pH-modified WS-ODSO composition of an acidic WS-ODSO composition and an alkaline agent, and wherein the (N−1)th supernatant comprises the alkaline agent as all or a portion of mineralizer required for the Nth synthesis. In certain of the above embodiments, the (N−1)th supernatant serves as a portion of water required for the Nth synthesis or as all utility water required for the Nth synthesis. In certain of the above embodiments, the one or more WS-ODSO compounds are provided as a pH-modified WS-ODSO composition of an acidic WS-ODSO composition and an alkaline agent, and wherein the supernatant from an (N−X)th synthesis comprises the alkaline agent as all or a portion of mineralizer required for the Nth synthesis. In certain of the above embodiments, the one or more WS-ODSO compounds are provided as a pH-modified WS-ODSO composition of an acidic WS-ODSO composition and an alkaline agent, and wherein the supernatant from an (N−X)th synthesis comprises at least a portion of the water required for the Nth synthesis.

In certain of the above embodiments in which an alkaline agent is used, the alkaline agent is selected from the group consisting of sodium hydroxide, calcium hydroxide, lithium hydroxide, strontium hydroxide, barium hydroxide, potassium hydroxide, cesium hydroxide, rubidium hydroxide, ammonia, ammonium hydroxide, lithium hydroxide, zinc hydroxide, trimethylamine, pyridine, beryllium hydroxide, magnesium hydroxide, and combinations of one of the foregoing alkaline agents. In certain embodiments the alkaline agent is selected from the group consisting of sodium hydroxide, potassium hydroxide, rubidium hydroxide, lithium hydroxide, cesium hydroxide, and combinations of one of the foregoing alkaline agents.

In certain of the above embodiments, the pH-modified WS-ODSO composition is a neutralized WS-ODSO composition having a pH in the range of about 6-8, 6.5-7.5, 6.8-7.2, 6.9-7.1 or 7. In certain of the above embodiments, the pH-modified WS-ODSO composition is a basified WS-ODSO composition having a pH greater than 7, 8, 9 or 10. In certain of the above embodiments.

In certain embodiments, the one or more WS-ODSO compounds is selected from the group consisting of WS-ODSO compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR), (R'—SOO—SOO—OR) and mixtures thereof, where R and R' are C1-C10 alkyl or C6-C10 aryl. In certain embodiments, the one or more WS-ODSO compounds is selected from the group consisting of WS-ODSO compounds having the general formula (R—SOO—SO—R'), (R—SOO—SOO—R'), (R—SO—SOO—OH), (R—SOO—SOO—OH), (R—SO—SO—OH), (R—SOO—SO—OH), and mixtures thereof, where R and R' are C1-C10 alkyl or C6-C10 aryl. In certain embodiments, the one or more WS-ODSO compounds comprises a mixture of two or more types of WS-ODSO compounds selected from the group consisting of WS-ODSO compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), where R and R' are C1-C10 alkyl or C6-C10 aryl. In certain embodiments, the one or more WS-ODSO compounds comprises a mixture of two or more types of WS-ODSO compounds having the general formula (R—SOO—SO—R'), (R—SOO—SOO—R'), (R—SO—SOO—OH), (R—SOO—SOO—OH), (R—SO—SO—OH), (R—SOO—SO—OH), and mixtures thereof, where R and R' are C1-C10 alkyl or C6-C10 aryl. In certain embodiments, the mixture is derived from oxidation of disulfide oil compounds present in an effluent refinery hydrocarbon stream recovered following catalytic oxidation of mercaptans present in a mercaptan-containing hydrocarbon stream.

In certain embodiments, the material in the first and/or subsequent syntheses comprise zeolites possessing MFI, FAU, *BEA, MOR, or CHA frameworks. In certain embodiments, the material in the first and/or subsequent syntheses comprise ZSM-5.

Any combinations of the various embodiments and implementations disclosed herein can be used. These and other aspects and features can be appreciated from the following description of certain embodiments and the accompanying drawings and claims.

BRIEF DESCRIPTION OF THE DRAWINGS

The process of the disclosure will be described in more detail below and with reference to the attached drawings in which the same number is used for the same or similar elements.

DETAILED DESCRIPTION OF CERTAIN EMBODIMENTS OF THE DISCLOSURE

Figure 1:
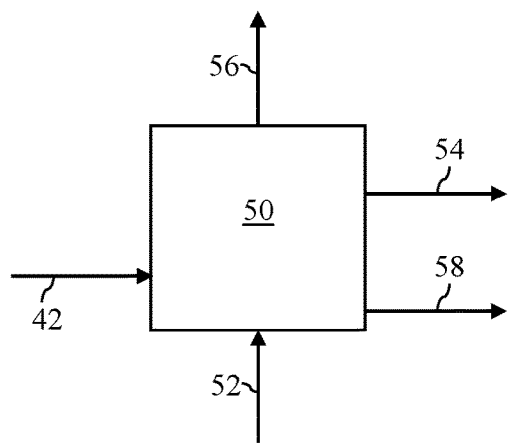
FIG. 1 is a simplified schematic diagram of a method for pH-modification of WS-ODSO.

Methods are disclosed for synthesizing materials, including an initial synthesis in the presence of WS-ODSO (which can include a pH-modified WS-ODSO composition, in certain embodiments a neutralized WS-ODSO composition), and one or more subsequent syntheses using supernatant ("mother liquor") from a previous synthesis of the same or different materials. The synthesized materials in the initial synthesis and in subsequent syntheses can be the same or different inorganic oxide materials including amorphous oxides, crystalline oxides or oxides of metals. The methods advantageously reduce the amount of utility water required for synthesizing a material and reduce the water waste, and reduce the DSO waste from a refinery and discharge into the environment. In certain embodiments the methods reduce the requirements to procure an alkaline reagent required for synthesizing materials. In certain embodiments, supernatant can be recycled over multiple synthesis batches of the same or different type of material, wherein a subsequent synthesis uses supernatant from a previous synthesis, optionally in combination with an additional amount of WS-ODSO component (which in certain embodiments can be a pH-modified WS-ODSO composition).

In certain embodiments, using a pH-modified WS-ODSO composition as a component or reagent in an initial synthesis, the requirement of utility water (typically deionized water) for zeolite syntheses across multiple batches is reduced by 50-100, 75-100 or 90-100 mass percent. In certain embodiments, using pH-modified WS-ODSO composition as a component or reagent in an initial synthesis, the amount of a mineralizer or alkaline agent from a procured source such as NaOH for zeolite syntheses is reduced by 50-100, 75-100 or 90-100 mass percent across multiple batches, particularly in embodiments in which pH-modified WS-ODSO is neutralized WS-ODSO or basified WS-ODSO, as it comprises a sufficient amount of an alkaline agent such as NaOH as a zeolite mineralizer in a subsequent batch.

In certain embodiment, a zeolite effluent mother liquor (supernatant) is derived from an initial synthesis that utilizes a neutralized WS-ODSO composition, wherein the initial zeolite synthesis was carried out using an amount of free utility water that is reduced by 50-100, 75-100 or 90-100 mass percent, and an amount of added alkaline reagent (that is, procured mineralizer such as a NaOH reagent) that is reduced by 50-100, 75-100 or 90-100 mass percent, the reductions being relative to a comparable process without using neutralized WS-ODSO in an initial synthesis. That supernatant is recycled by using it all or a portion thereof as a component in further zeolite syntheses, and this recycling can be carried out several times so that those subsequent syntheses can also be carried out realizing a reduction in added utility water consumption and mineralizer or alkaline agent procurement requirement of 50-100, 75-100 or 90-100 mass percent.

In certain embodiments, a pH-modified WS-ODSO composition is used in the initial synthesis, which can be a neutralized WS-ODSO composition or a basified WS-ODSO composition, wherein the pH-modified WS-ODSO composition is as described in co-pending and commonly owned U.S. patent application Ser. No. 17/850,158 filed on Jun. 27, 2022, entitled "pH-Modified Water-Soluble Oxidized Disulfide Oil Compositions," which is incorporated by reference herein in its entirety. In certain embodiments, a pH-modified WS-ODSO composition is used in the initial synthesis, which can be a neutralized WS-ODSO composition or a basified WS-ODSO composition that is made as described in co-pending and commonly owned U.S. patent application Ser. No. 17/850,219 filed on Jun. 27, 2022, entitled "Methods Of Modifying pH Of Water-Soluble Oxidized Disulfide Oil," which is incorporated by reference herein in its entirety. In certain embodiments, the initial synthesis is a zeolite synthesis using WS-ODSO as a component, such as a pH-modified WS-ODSO composition, as described in co-pending and commonly owned U.S. patent application Ser. No. 17/850,115 filed on Jun. 27, 2022, entitled "Method Of Zeolite Synthesis Including pH-Modified Water-Soluble Oxidized Disulfide Oil Composition," which is incorporated by reference herein in its entirety.

The WS-ODSO is an acidic component. In certain embodiments, an initial synthesis in the process herein is carried out in the presence of an effective amount of a pH-modified WS-ODSO composition, for instance wherein the initial WS-ODSO is deacidified, neutralized or basified, WS-ODSO.

With reference to FIG. 1, an example of a method of making a pH-modified WS-ODSO composition is shown, as disclosed in co-pending and commonly owned U.S. patent application Ser. No. 17/850,219 filed on Jun. 27, 2022, referenced above. A reaction vessel 50 is provided, for example generally selected from one or more of a fixed-bed reactor, an ebullated bed reactor, a slurry bed reactor, a moving bed reactor, a continuous stirred tank reactor, and a tubular reactor. The reaction vessel 50 includes: one or more inlets in fluid communication with a source of, and configured and arranged for receiving, an effective amount of WS-ODSO, influent stream 42; one or more inlets in fluid communication with a source of, and configured and arranged for receiving, an effective amount of alkaline agent, influent stream 52; and one or more outlets for discharging a composition having an increased pH relative to the influent WS-ODSO, effluent stream 54. In addition, gases are discharged, typically as byproduct, effluent stream 56, and solids can be formed during reaction of WS-ODSO and alkaline agent; which can be removed from the system, represented by stream 58 (which can be removed continuously, semi-continuously or in batch). As explained herein, depending on the amount of alkaline agent used, the pH level of the effluent stream 54 is greater than the pH of the influent WS-ODSO, but the ultimate level can vary. In certain embodiments the pH level of the effluent stream 54 is neutral or approximately neutral pH. In certain embodiments the pH level of the effluent stream 54 is deacidified relative to the influent WS-ODSO. In certain embodiments the pH level of the effluent stream 54 is basic.

The herein disclosed methods and compositions improve the environmental and economic impact of zeolite synthesis, whereby recycled mother liquor containing a WS-ODSO component is used in zeolite synthesis. Hydrothermal reaction of zeolite precursors is carried out using a WS-ODSO composition or a pH-modified WS-ODSO composition as an additional synthesis component. After each synthesis, the mother liquor, typically after separation by centrifuge and/or filtration from the precipitate, is recycled. In certain embodiments, additional precursors are added to the recycled supernatant in the same vessel in which the previous synthesis occurred. In certain embodiments, the supernatant is recovered and recycled for use in a separate synthesis. Through recycling, reagents in the mother liquors can be effectively utilized while minimizing or eliminating waste.

Figure 2:
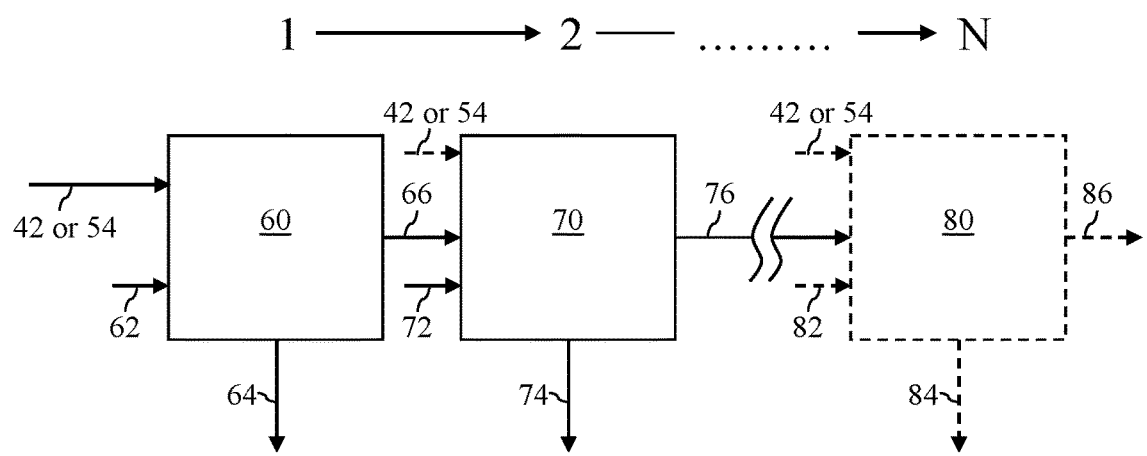
FIG. 2 is a simplified schematic diagram of a method of synthesizing materials including recycle of supernatant to a subsequent synthesis of materials.

With reference to FIG. 2, an example of plural syntheses of materials including recycle of supernatant to a subsequent synthesis. A first synthesis, schematically shown as step 60, is carried out under suitable conditions and with suitable precursors and reagents for synthesis a first material. A total of N syntheses can be carried out wherein N≥2. For example, second synthesis (N=2) is schematically shown as step 70. Optionally further syntheses can be carried out, which can be up to an Nth synthesis where N≥3, schematically shown as step 80 (shown in dashed lines). In the first synthesis 60, the initial synthesis in a series of two or more syntheses, effective types and quantities of precursors and reagents for synthesis of a first material is provided, 62. In addition, an effective amount of a WS-ODSO component is provided, which can be WS-ODSO, 42, or pH-modified WS-ODSO, 54. After precipitated solids are removed from the first synthesis 60, first material 64, all or a portion of supernatant 66 is added as a component in a second synthesis 70, wherein effective types and quantities of precursors and reagents for synthesis of a second material is provided, 72. In certain embodiments, the supernatant 66 contains residual silica, and the amount of precursors in 72 is adjusted accordingly. In certain embodiments, the supernatant 66 contains residual structure directing agent, and the amount of structure directing agent in 72 is adjusted accordingly. In certain embodiments, along with supernatant 66, an additional amount of a make-up WS-ODSO component is provided, which can be WS-ODSO, 42, or pH-modified WS-ODSO, 54. The second material can be the same or different than the first material. Optionally, after precipitated solids are removed from the second synthesis 70, second material 74, all or a portion of supernatant 76 is added as a component in a subsequent Nth synthesis 80, wherein effective types and quantities of precursors and reagents for synthesis of a Nth material is provided, 82. In certain embodiments, the supernatant 76 contains residual silica, and the amount of precursors in 82 is adjusted accordingly. In certain embodiments, the supernatant 76 contains residual structure directing agent, and the amount of structure directing agent in 82 is adjusted accordingly. In certain embodiments, along with supernatant 76, an additional amount of a make-up WS-ODSO component is provided, which can be WS-ODSO, 42, or pH-modified WS-ODSO, 54. The Nth material can be the same or different than the first material and/or the second material. Precipitated solids are removed from the Nth synthesis 80, Nth material 84, and all or a portion of supernatant 86 can be used in an (N+1)th synthesis, and so on.

Accordingly, a process for synthesis of zeolite or zeolite-type materials comprises heating a homogeneous aqueous mixture of precursors and reagents for a first synthesis of a material, and a WS-ODSO component, under conditions and for a time effective to form zeolite or zeolite-type materials as a first precipitate suspended in a first supernatant. All or a portion of the first precipitate is separated from the first supernatant. The first supernatant is used as a component in a subsequent synthesis of a same, similar or different type of material. The number of sequential syntheses can continue until the concentration of necessary components (such as alkali metal component as a source of $OH^-$ mineralizer) is sufficient. In embodiments disclosed herein, make-up WS-ODSO (including pH-modified WS-ODSO in certain embodiments) is added, and the number of sequential syntheses can increase further. For example, described herein is an example with four syntheses in sequential examples, with the second, third and fourth using supernatant from the previous synthesis. As explained herein, N syntheses are possible, wherein N is an integer greater than or equal to 2, and wherein the Nth synthesis uses supernatant from the (N−X)th synthesis, wherein X is an integer between 1 and (N−1). For example, an Nth synthesis includes forming an Nth homogeneous aqueous mixture of precursors and reagents for the Nth synthesis, and all or a portion of the first or second supernatant if N=3, or all or a portion of a first, second or third supernatant if N=4, or all or a portion of a (N−1)th or earlier supernatant if N>3. The Nth homogeneous aqueous mixture is heated under conditions and for a time effective to form a material as an Nth precipitate suspended in an Nth supernatant. In certain embodiments the Nth supernatant contains WS-ODSO and can be used a component in a subsequent (N+1)th synthesis, and so on.

In certain embodiments, materials synthesized in one or more of the first, second or subsequent syntheses herein include one or more of zeolites identified by the International Zeolite Association, including those with the identifiers ABW, ACO, AEI, AEL, AEN, AET, AFG, AFI, AFN, AFO, AFR, AFS, AFT, AFV, AFX, AFY, AHT, ANA, ANO, APC, APD, AST, ASV, ATN, ATO, ATS, ATT, ATV, AVE, AVL, AWO, AWW, BCT, BEC, BIK, BOF, BOG, BOZ, BPH, BRE, BSV, CAN, CAS, CDO, CFI, CGF, CGS, CHA, CHI, -CLO, CON, CSV, CZP, DAC, DDR, DFO, DFT, DOH, DON, EAB, EDI, EEI, EMT, EON, EPI, ERI, ESV, ETL, ETR, ETV, EUO, EWO, EWS, EZT, FAR, FAU, FER, FRA, GIS, GIU, GME, GON, GOO, HEU, IFO, IFR, -IFT, -IFU, IFW, IFY, IHW, IMF, IRN, IRR, -IRY, ISV, ITE, ITG, ITH, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, MRT, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POR, POS, PSI, PTO, PTT, PTY, PUN, PWN, PWO, PWW, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, SFW, SGT, SIV, SOD, SOF, SOR, SOS, SOV, SSF, SSY, STF, STI, STT, STW, -SVR, SVV, SWY, -SYT, SZR, TER, THO, TOL, TON, TSC, TUN, UEI, UFI, UOS, UOV, UOZ, USI, UTL, UWY, VET, VFI, VNI, VSV, WEI, -WEN, YFI, YUG, ZON, *BEA, *CTH, *-EWT, *-ITN, *MRE, *PCS, *SFV, *-SSO, *STO, *-SVY, *UOE. In certain embodiments, materials synthesized in one or more of the first, second or subsequent syntheses herein comprise co-crystallized products of two or more types of zeolites identified above. In certain embodiments, materials synthesized in one or more of the first, second or subsequent syntheses herein comprise purely siliceous crystalline materials with a SAR close to infinity, such as silicalites (e.g., Silicalite-1).

For example, certain non-limiting examples of materials known to be useful in the petroleum refining industry include but are not limited to zeolites possessing MFI, FAU, *BEA, MOR, or CHA frameworks. In certain embodiments a material synthesized in one or more of the first, second or subsequent syntheses can be MFI framework zeolite, which includes ZSM-5, having a micropore size related to the 10-member rings when viewed along the [100] and [010] directions of 5.5×5.1 Å and 5.6×5.3 Å, respectively. In certain embodiments a material synthesized in one or more of the first, second or subsequent syntheses can be FAU framework zeolite, which includes USY, having a micropore size related to the 12-member ring when viewed along the [111] direction of 7.4×7.4 Å. In certain embodiments a material synthesized in one or more of the first, second or subsequent syntheses can be *BEA framework zeolite, which includes zeolite beta polymorph A, having a micropore size related to the 12-member rings when viewed along the [100] and [001] directions of 6.6×6.7 Å and 5.6×5.6 Å, respectively. In certain embodiments a material synthesized in one or more of the first, second or subsequent syntheses can be MOR framework zeolite, which includes mordenite zeolites, having a micropore size related to the 12-member ring and 8-member ring when viewed along the [001] and [001] directions of 6.5×7.0 Å and 2.6×5.7 Å, respectively. In certain embodiments a material synthesized in one or more of the first, second or subsequent syntheses can be CHA framework zeolite, which includes chabazite zeolite, having a micropore size related to the 8-member ring when viewed normal to the [001] direction of 3.8×3.8 Å.

In certain embodiments, selection and ratios of precursors and reagents effective for synthesis of zeolite materials are known, including a silica source, an optional alumina source, a mineralizer, and optionally one or both of a structure directing agent and/or a seed material, which are formed as a homogeneous aqueous solution. In embodiments herein, an initial synthesis is of zeolite and includes in its sol-gel a WS-ODSO component (a WS-ODSO composition or a pH-modified WS-ODSO composition). In embodiments herein, an initial synthesis of zeolite includes a pH-modified WS-ODSO composition that contributes a portion of requisite water for the sol-gel. In embodiments herein, an initial synthesis of zeolite includes a pH-modified WS-ODSO composition that contributes all or a portion of requisite mineralizer for the sol-gel. In embodiments herein, one or more subsequent syntheses is of zeolite and includes in its sol-gel supernatant from a prior synthesis, wherein at least an initial synthesis includes a WS-ODSO component. In embodiments herein, a subsequent synthesis of zeolite includes a supernatant as described herein that contributes a portion of requisite water for the sol-gel. In embodiments herein, a subsequent synthesis of zeolite includes a supernatant as described herein that contributes all or a portion of requisite mineralizer for the sol-gel.

In certain embodiments, materials synthesized in one or more of the first, second or subsequent syntheses herein comprise amorphous inorganic oxide materials, mesoporous inorganic oxide materials, metal oxide materials, crystalline inorganic oxide materials, zeolites and/or zeolite-type materials such as crystalline silico-alumino-phosphate (SAPO), alumino-phosphate (AlPO) materials or metal aluminophosphate (MAPO) materials.

In certain embodiments, selection and ratios of precursors and reagents effective for synthesis of amorphous silica-alumina are known, including an alumina source and a silica source, which are formed as a homogeneous aqueous solution. In embodiments herein, an initial synthesis is of amorphous silica-alumina and includes in its sol-gel a WS-ODSO component (a WS-ODSO composition or a pH-modified WS-ODSO composition). In embodiments herein, one or more subsequent syntheses is of amorphous silica-alumina and includes in its sol-gel supernatant from a prior synthesis, wherein at least an initial synthesis includes a WS-ODSO component.

In certain embodiments, selection and ratios of precursors and reagents effective for synthesis of amorphous alumina are known, including an alumina source and optionally pore-forming agent, which are formed as a homogeneous aqueous solution. In embodiments herein, an initial synthesis is of amorphous alumina and includes in its sol-gel a WS-ODSO component (a WS-ODSO composition or a pH-modified WS-ODSO composition). In embodiments herein, one or more subsequent syntheses is of amorphous alumina and includes in its sol-gel supernatant from a prior synthesis, wherein at least an initial synthesis includes a WS-ODSO component.

In certain embodiments, selection and ratios of precursors and reagents effective for synthesis of amorphous silica are known, including a silica source, which are formed as a homogeneous aqueous solution. In embodiments herein, an initial synthesis is of amorphous silica and includes in its sol-gel a WS-ODSO component (a WS-ODSO composition or a pH-modified WS-ODSO composition). In embodiments herein, one or more subsequent syntheses is of amorphous silica and includes in its sol-gel supernatant from a prior synthesis, wherein at least an initial synthesis includes a WS-ODSO component.

In certain embodiments, selection and ratios of precursors and reagents effective for synthesis of mesoporous silica materials having long range order are known, including a silica source, an acid medium, and a surfactant as a soft template material to influence a silica mesoporous structure, which are formed as a homogeneous aqueous solution. In embodiments herein, an initial synthesis is of mesoporous silica and includes in its sol-gel a WS-ODSO component (a WS-ODSO composition or a pH-modified WS-ODSO composition). In embodiments herein, one or more subsequent syntheses is of mesoporous silica and includes in its sol-gel supernatant from a prior synthesis, wherein at least an initial synthesis includes a WS-ODSO component.

In certain embodiments, selection and ratios of precursors and reagents effective for synthesis of SAPO materials are known, including an alumina source, a silica source, a phosphorus source, an acid medium, and optionally one or both of a structure directing agent and/or a seed material, which are formed as a homogeneous aqueous solution. It is understood that the phosphorus source and the acid medium can be the same, for instance, phosphoric acid. In embodiments herein, an initial synthesis is of SAPO and includes in its sol-gel a WS-ODSO component (a WS-ODSO composition or a pH-modified WS-ODSO composition). In embodiments herein, one or more subsequent syntheses is of SAPO and includes in its sol-gel supernatant from a prior synthesis, wherein at least an initial synthesis includes a WS-ODSO component.

In certain embodiments, selection and ratios of precursors and reagents effective for synthesis of AlPO materials are known, including an alumina source, a phosphorus source, an acid medium, and optionally one or both of a structure directing agent and/or a seed material, which are formed as a homogeneous aqueous solution. It is understood that the phosphorus source and the acid medium can be the same, for instance, phosphoric acid. In embodiments herein, an initial synthesis is of AlPO and includes in its sol-gel a WS-ODSO component (a WS-ODSO composition or a pH-modified WS-ODSO composition). In embodiments herein, one or more subsequent syntheses is of AlPO and includes in its sol-gel supernatant from a prior synthesis, wherein at least an initial synthesis includes a WS-ODSO component.

In certain embodiments, selection and ratios of precursors and reagents effective for synthesis of MAPO materials, including an alumina source, a metal source, a phosphorus source, an acid medium, and optionally one or both of a structure directing agent and/or a seed material, which are formed as a homogeneous aqueous solution. It is understood that the phosphorus source and the acid medium can be the same, for instance, phosphoric acid. The metal source can be one or more of Ti, V, Cr, Mn, Fe, Co, Ni, Cu, Zn, Cd or Mg. In embodiments herein, an initial synthesis is of MAPO and includes in its sol-gel a WS-ODSO component (a WS-ODSO composition or a pH-modified WS-ODSO composition). In embodiments herein, one or more subsequent syntheses is of MAPO and includes in its sol-gel supernatant from a prior synthesis, wherein at least an initial synthesis includes a WS-ODSO component.

Methods for the preparation of various types of materials are known and discussed herein for reference, but it is understood that variations of that which is disclosed herein can benefit from the use of a recycled supernatant containing WS-ODSO or pH-modified WS-ODSO from a prior synthesis.

In a method of synthesizing materials herein, effective amounts and proportions of precursors and reagents are formed as a homogeneous aqueous mixture, including a water source, an optional alumina source, a silica source, an alkali metal source (mineralizer), an optional structure directing agent and an optional seed material. The synthesis is carried out using supernatant from a prior synthesis of zeolite in the presence of a WS-ODSO component (which can be (a) a WS-ODSO composition, (b) a pH-modified WS-ODSO composition, and/or (c) a separate supernatant from a prior synthesis of zeolite in the presence of a WS-ODSO component).

In an embodiment of a serial method of synthesizing materials (of the same or different types), effective amounts and proportions of precursors and reagents are formed as homogeneous aqueous mixtures, including for each mixture a water source, an optional alumina source, a silica source, an alkali metal source (in the hydroxide form, mineralizer), an optional structure directing agent and an optional seed material. Serial syntheses are carried out, with those after an initial synthesis using supernatant from one or more prior syntheses. In an initial synthesis of a material, precursors and reagents are formed as a homogeneous aqueous mixture together with a WS-ODSO component (which can be a WS-ODSO composition or a pH-modified WS-ODSO composition). In one or more subsequent syntheses of a material, precursors and reagents are formed as a homogeneous aqueous mixture together with supernatant from the first synthesis, containing WS-ODSO compounds and other supernatant components.

In certain embodiments of a serial method herein, an initial synthesis of a material includes an effective amount of a WS-ODSO composition as an additional component. In certain embodiments of a serial method herein, an initial synthesis of a material includes an effective amount of a pH-modified WS-ODSO composition as an additional component; the pH-modified WS-ODSO can be a neutralized WS-ODSO composition or a basified WS-ODSO composition. In certain embodiments, the WS-ODSO composition or the pH-modified WS-ODSO composition is used in place of a certain amount of water. In certain embodiments, the WS-ODSO composition or the pH-modified WS-ODSO composition is used in place of an equivalent amount (on a volume or mass basis) of utility water for the homogeneous aqueous mixture (that is, 100% reduction in requisite utility water relative to a comparable synthesis without the WS-ODSO composition or the pH-modified WS-ODSO composition). In certain embodiments the pH-modified WS-ODSO composition is used in place of all or a portion of added mineralizer (that is, the need to procure a quantity of separate mineralizer reagent for synthesis can be avoided). In certain embodiments the pH-modified WS-ODSO composition is used in place of all or a portion of a separate mineralizer reagent for synthesis, and in place of a certain amount of water (including all or a portion of added utility water).

In certain of embodiments in a serial method herein, a subsequent synthesis of a material includes an effective amount of supernatant from a prior synthesis. The prior synthesis can be an initial synthesis in which a WS-ODSO composition or a pH-modified WS-ODSO composition is used as an additional component as described herein, or a subsequent synthesis using a supernatant. That is, a recycled supernatant from a second or later synthesis can be used in subsequent syntheses. In certain embodiments, recycled (once, twice, thrice, etc.) supernatant is used in place of a certain amount of water in a material synthesis process. In certain embodiments, recycled (once, twice, thrice, etc.) supernatant is used in place of an equivalent amount (on a volume or mass basis) of utility water for the homogeneous aqueous mixture (that is, 100% reduction in requisite utility water relative to a comparable water-only synthesis without). In certain embodiments the recycled (once, twice, thrice, etc.) supernatant is used in place of all or a portion of the procurement of the requisite mineralizer for synthesis of a material. In certain embodiments the recycled (once, twice, thrice, etc.) supernatant is used in place of all or a portion of the procurement of the requisite mineralizer for synthesis of a material, and in place of a certain amount of water (including all or a portion of utility water).

The components are mixed for an effective time and under conditions suitable to form the homogeneous aqueous mixture. The chronological sequence of mixing can vary, with the objective being a highly homogenous distribution of the components in an aqueous mixture. The homogeneous aqueous mixture is heated under conditions and for a time effective to form a precipitate (product) suspended in a supernatant (mother liquor). The precipitate is recovered, for example by filtration, washing and drying. The eventual structure or framework of the as-made material(s) depend on various factors including but not limited to the selection and compositional ratios of components, time and temperature of hydrothermal reaction; selected structure directing agents (if any); selected seeds (if any); and/or selected mineralizer. In certain embodiments, inclusion of a pH-modified neutralized WS-ODSO composition in an initial synthesis shifts a phase boundary of a sol-gel composition to a desired zeolite framework type having an equivalent amount of water being replaced, even using compositional ratios and conditions (other than the WS-ODSO) typically effective for synthesis of a different type of zeolite, or that would typically produce amorphous material.

In certain embodiments, recovered precipitate is calcined at a suitable temperature, temperature ramp rate and for a suitable period of time. In certain embodiments, calcining is carried out to increase porosity. In certain embodiments, calcining is carried out to remove all or a portion of structure directing agent components that remain in the precipitate to realize porous zeolite.

An effective amount of water for the aqueous environment and as a solvent during the sol-gel process can be provided from one or more water sources, including utility water that is added to form the homogeneous aqueous mixture, a water-containing silica source such as colloidal silica, an aqueous mixture of an optional aluminum oxide source, an aqueous mixture of an alkali metal source, and/or an aqueous mixture of an optional structure directing agent. These mixture components are added with water to the reaction vessel prior to heating. Typically, water allows for adequate mixing to realize a more homogeneous distribution of the sol-gel components, which ultimately produces a more desirable product because each crystal is more closely matched in properties to the next crystal. Insufficient mixing could result in undesirable "pockets" of highly concentrated sol-gel components and this may lead to impurities in the form of different structural phases or morphologies. Water also determines the yield per volume. In the descriptions that follow, it is understood that water is a component of homogeneous aqueous mixtures from one or more of the sources of water.

In embodiments herein, a portion of the effective amount of water required for sol-gel synthesis in an initial synthesis is replaced with a WS-ODSO component, which can be a WS-ODSO composition or a pH-modified WS-ODSO composition. The water that is replaced in an initial synthesis with a WS-ODSO component can be all or a portion of the utility water that would typically be added. In embodiments herein, a portion of the effective amount of water required for sol-gel synthesis in one or more subsequent syntheses is replaced with supernatant from one or more prior syntheses, and the water that is replaced in subsequent syntheses with supernatant can be all or a portion of the utility water that would typically be added.

In certain embodiments, the homogeneous aqueous mixture is formed by: providing a silica source; combining an optional aluminum oxide source, an optional mineralizer and an optional structure directing agent; and combining a pH-modified WS-ODSO composition. Alternatively, the pH-modified WS-ODSO composition is combined with the optional aluminum oxide source, the optional mineralizer and the optional structure directing agent, and that mixture is combined with the silica source.

In certain embodiments, the homogeneous aqueous mixture is formed by: providing an optional aluminum oxide source, an optional mineralizer and an optional structure directing agent as a mixture; combining a silica source; and combining a WS-ODSO component (a WS-ODSO composition or a pH-modified WS-ODSO composition). Alternatively, the WS-ODSO component is combined with the silica source, and that mixture is combined with the optional aluminum oxide source, the optional mineralizer and the optional structure directing agent.

In certain embodiments, the homogeneous aqueous mixture is formed by: combining a WS-ODSO component (a WS-ODSO composition or a pH-modified WS-ODSO composition) with a silica source to form a mixture; and that mixture is combined with an optional aluminum oxide source, an optional mineralizer and an optional structure directing agent.

In certain embodiments, the homogeneous aqueous mixture is formed by: combining a WS-ODSO component (a WS-ODSO composition or a pH-modified WS-ODSO composition) with an optional aluminum oxide source, an optional mineralizer and an optional structure directing agent to form a mixture; and that mixture is combined with a silica source.

A homogeneous aqueous mixture of the optional aluminum source, silica source, optional mineralizer, optional structure directing agent and a WS-ODSO component (a WS-ODSO composition or a pH-modified WS-ODSO composition) is formed from any of the above chronological sequences of component addition. The homogeneous aqueous mixture heated under conditions and for a time effective to form a precipitate suspended in a supernatant, which is recovered, for example by filtration, washing and drying. In certain embodiments the recovered precipitate is calcined at a suitable temperature, temperature ramp rate and for a suitable period of time.

In certain embodiments, the homogeneous aqueous mixture is formed by: providing a silica source; combining an optional aluminum oxide source, an optional mineralizer and an optional structure directing agent; and combining a supernatant from a prior synthesis, wherein at least one or more prior syntheses includes a WS-ODSO component (a WS-ODSO composition or a pH-modified WS-ODSO composition). Alternatively, the supernatant is combined with the optional aluminum oxide source, the optional mineralizer and the optional structure directing agent, and that mixture is combined with the silica source.

In certain embodiments, the homogeneous aqueous mixture is formed by: providing an optional aluminum oxide source, an optional mineralizer and an optional structure directing agent as a mixture; combining a silica source; and combining a supernatant from a prior synthesis, wherein at least one or more prior syntheses includes a WS-ODSO component (a WS-ODSO composition or a pH-modified WS-ODSO composition). Alternatively, the supernatant is combined with the silica source, and that mixture is combined with the optional aluminum oxide source, the optional mineralizer and the optional structure directing agent.

In certain embodiments, the homogeneous aqueous mixture is formed by: combining a supernatant from a prior synthesis, wherein at least one or more prior syntheses includes a WS-ODSO component (a WS-ODSO composition or a pH-modified WS-ODSO composition) with a silica source to form a mixture; and that mixture is combined with an optional aluminum oxide source, an optional mineralizer and an optional structure directing agent.

In certain embodiments, the homogeneous aqueous mixture is formed by: combining a supernatant from a prior synthesis, wherein at least one or more prior syntheses includes a WS-ODSO component (a WS-ODSO composition or a pH-modified WS-ODSO composition), with an optional aluminum oxide source, an optional mineralizer and an optional structure directing agent to form a mixture; and that mixture is combined with a silica source.

A homogeneous aqueous mixture of the optional aluminum source, silica source, optional mineralizer, optional structure directing agent and a supernatant from a prior synthesis, wherein at least one or more prior syntheses includes a WS-ODSO component (a WS-ODSO composition or a pH-modified WS-ODSO composition), is formed from any of the above chronological sequences of component addition. The homogeneous aqueous mixture heated under conditions and for a time effective to form a precipitate suspended in a supernatant, which is recovered, for example by filtration, washing and drying. In certain embodiments the recovered precipitate is calcined at a suitable temperature, temperature ramp rate and for a suitable period of time.

It is to be appreciated by those skilled in the art that in certain embodiments effective baseline compositional ratios for synthesis of zeolites as the selected type of material as disclosed herein can be determined by empirical data, for instance summarized as phase boundary diagrams or other methodologies as is known in material synthesis. In certain embodiments, baseline compositional ratios and conditions are effective, in the absence of a pH-modified WS-ODSO composition, for synthesis one type of zeolite or an amorphous material, and according to certain embodiments of the process herein, inclusion of a pH-modified WS-ODSO composition results in shifting the material type out of the phase boundary diagram, even at approximately equivalent ratios, to a different type of zeolite or an amorphous material.

In certain embodiments, effective ratios of precursors and reagents for production of zeolites herein are within those known to produce templated aluminosilicate zeolites and can be determined by those of ordinary skill in the art. For example, effective amounts of silica and alumina precursors are provided to produce synthesized zeolite having a silica-to-alumina ratio (SAR) in the range of about 2-10000, 2-5000, 2-500, 2-100, 2-80, 10-10000, 10-5000, 10-500, 10-100, 10-80, 50-10000, 50-5000, 50-1000, 50-500 or 50-100. The SAR levels in the synthesized zeolite depends on the type of zeolite; for instance: MFI zeolites including ZSM-5 have effective SAR (mol/mol) values in the synthesized zeolite in the range of about 20-1500, 20-1000, 20-500, 25-1500, 25-1000, 25-500, 50-1500, 50-1000, 50-500, 100-1500, 100-1000 or 100-500; *BEA zeolites and/or MOR zeolites have effective SAR (mol/mol) values in the synthesized zeolite of greater than 10, in certain embodiments in the range of about 10-10000, 10-5000, 10-500, 10-100, 10-80, 50-10000, 50-5000, 50-1000, 50-500 or 50-100; zeolite Y has effective SAR (mol/mol) values in the synthesized zeolite in the range of about 3-6. In embodiments in which a structure directing agent is used, an effective amount includes a molar ratio (normalized to 1 mole of $Al_2O_3$) in the range of about 0.1-75, 0.1-50, 0.1-30, 0.1-20, 0.1-15, 1-75, 1-50, 1-30, 1-20, 1-15, 2.5-75, 2.5-50, 2.5-30, 5-75, 5-50 or 5-30.

In certain embodiments, baseline compositional ratios of the aqueous composition used to produce zeolites herein include (on a molar basis):

$SiO_2/Al_2O_3$: 10-1500
$OH^-/SiO_2$: 0.05-3
$R/SiO_2$: 0-1.5
Alkali metal cation/$SiO_2$: 0.075-1.5
$H_2O/SiO_2$: 5-120
wherein R is the structure directing agent, and a level of 0 represents absence of the structure directing agent.
It is appreciated by those skilled in the art that these molar composition ratios can be expressed on a mass basis.

As is known, different ratios of materials are used depending on the desired zeolite to be produced. In the embodiments herein of the initial synthesis, ratios of components in homogeneous aqueous mixtures including WS-ODSO are sometimes referred to as "WS-ODSO-enhanced compositional ratios." In certain embodiments a WS-ODSO-enhanced compositional ratio is one in which WS-ODSO is included to replace an approximately equivalent mass of a certain amount of water in the homogeneous aqueous mixture, and wherein a cumulative amount of WS-ODSO and water (WS-ODSO+$H_2O$) is approximately equivalent to a mass of water that is effective to produce the same or another type of zeolite, or an amorphous material, in the absence of WS-ODSO. In certain embodiments: a baseline compositional ratio of silica, optional aluminum, alkali metal, optional structure directing agent, optional seed and water is known or determined to be is effective to produce the same or another type of zeolite, or an amorphous material, in the absence of WS-ODSO; a WS-ODSO-enhanced compositional ratio is approximately equivalent to the baseline compositional ratio except for the substitution of WS-ODSO for water on a mass basis; and wherein the conditions and time of heating the sol-gel having the WS-ODSO-enhanced compositional ratio is approximately equivalent to those that are effective to produce the same or another type of zeolite, or an amorphous material, in the absence of WS-ODSO.

Similarly, in the embodiments herein of subsequent syntheses, ratios of components in homogeneous aqueous mixtures including supernatant are sometimes referred to as "supernatant-enhanced compositional ratios." In certain embodiments a supernatant-enhanced compositional ratio is one in which supernatant from a prior synthesis is included to replace an approximately equivalent mass of a certain amount of water in the homogeneous aqueous mixture, and wherein a cumulative amount of supernatant and water (supernatant+$H_2O$) is approximately equivalent to a mass of water that is effective to produce the same or another type of zeolite, or an amorphous material, in the absence of supernatant. In certain embodiments: a baseline compositional ratio of silica, optional aluminum, alkali metal, optional structure directing agent, optional seed and water is known or determined to be is effective to produce the same or another type of zeolite, or an amorphous material, in the absence of supernatant; a supernatant-enhanced compositional ratio is approximately equivalent to the baseline compositional ratio except for the substitution of supernatant for water on a mass basis; and wherein the conditions and time of heating the sol-gel having the supernatant-enhanced compositional ratio is approximately equivalent to those that are effective to produce the same or another type of zeolite, or an amorphous material, in the absence of supernatant.

The silica source can comprise, without limitation, one or more of silicates including sodium silicate (water glass), rice husk, fumed silica, precipitated silica, colloidal silica, silica gels, other zeolites, dealuminated zeolites, and silicon hydroxides and alkoxides. Silica sources resulting in a high relative yield are preferred. For instance, suitable materials as silica sources include fumed silica commercially available from Cabotand colloidal silica (LUDOX commercially available from Cabot.

The optional aluminum source can comprise, without limitation, one or more of aluminates, alumina, other zeolites, aluminum colloids, boehmites, pseudo-boehmites, aluminum salts such as aluminum nitrate, aluminum sulfate and alumina chloride, aluminum hydroxides and alkoxides, aluminum wire and alumina gels. For example, suitable materials as aluminum sources include commercially available materials including for instance high purity aluminas (CERALOX commercially available from Sasol) and alumina hydrates (PURAL and CAPITAL commercially available from Sasol), boehmites (DISPERSAL and DISPAL commercially available from Sasol), and silica-alumina hydrates (SIRAL commercially available from Sasol) and the corresponding oxides (SIRALOX commercially available from Sasol).

In embodiments in which structure directing agents are used, they are selected to influence the target type of zeolite structure to be formed. Effective structure directing agents that can optionally be added include known or developed structure directing agents include one or more of quaternary ammonium ions, trialkylamines, dialkylamines, monoalkylamines, cyclic amines, alkylethanol amines, cyclic diamines, alkyl diamines, alkyl polyamines, and other templates including alcohols, ketones, morpholine and glycerol. For example, in embodiments in which the target zeolite structures are MFI, including ZSM-5, beta zeolite, or mordenite zeolite, suitable structure directing agents include but are not limited to one or more of quaternary ammonium cation compounds (including one or more of tetramethylammonium (TMA) cation compounds, tetraethylammonium (TEA) cation compounds, tetrapropylammonium (TPA) cation compounds, tetrabutylammonium (TBA) cation compounds, cetyltrimethylammonium (CTA) cation compounds; the cation can be paired with one or more of a hydroxide anion (for example, TPAOH or CTAOH), a bromide anion (for example, TPAB or CTAB), or an iodide anion. In embodiments in which the target zeolite structures are MFI zeolites, including ZSM-5, structure directing agents include but are not limited to one or more of: those identified above for MFI zeolites; bifunctional dicationic molecules containing a long aliphatic chain (for example $C_{22}H_{45}$—$N^+(CH_3)_2$—$C_6H_{12}$—$N^+(CH_3)_2$—$C_6H_{13}$, denoted $C_{22-6-6}$, $C_{22}H_{45}$—$N^+(CH_3)_2$—$C_6H_{12}$—$N^+(CH_3)_2$—$C_3H_7$, denoted $C_{22-6-3}$, or a poly(ethylene glycol)); dual-porogenic surfactants; silylated polyethylenimine polymers; amphiphilic organosilanes; or hydrophilic cationic polyelectroyltes/polymers such as poly(diallyldimethylammonium chloride) (PDADMAC). In embodiments in which the target zeolite structures are beta zeolites, structure directing agents include but are not limited to one or more of: those identified above for beta zeolite; 4,4'trimethylene bis(N-methyl N-benzyl-piperidinium) hydroxide; 1,2-diazabicyclo 2,2,2, octane (DABCO); dialkylbenzyl ammonium hydroxide; dimethyldiisopropylammonium hydroxide (DMDPOH); N,N-dimethyl-2,6-cis-dimethylpiperdinium hydroxide (DMPOH); N-ethyl-N,N-dimethylcyclohexanaminium hydroxide (EDMCHOH); N,N,N-trimethylcyclohexanaminium hydroxide (TMCHOH); N-isopropyl-N-methyl-pyrrolidinium (iProOH); N-isobutyl-N-methyl-pyrrolidinium (iButOH); N-isopentyl-N-methyl-pyrrolidinium (iPenOH); or any of the thousands of structure directing agents for producing zeolite beta can be used, as disclosed in Daeyaerta et al., "Machine-learning approach to the design of OSDAs for zeolite beta," PNAS February, 116 (2019): 3413-3418. In embodiments in which the target zeolite structures are mordenite zeolite, structure directing agents include but are not limited to one or more of: those identified above for mordenite zeolite; mixed organic templates such as glycerol, ethylene glycol or polyethylene glycol; pyrrolidine-based mesoporogens; piperazine; 1,6-diaminohexane; diethylpiperidinium; or co-operative organic templates such as N,N,N-trimethyl-1,1-adamantammonium and 1,2-hexanediol.

The disclosed process for synthesizing zeolite herein can occur in the absence or presence of seed materials comprising zeolite structures of the same or similar crystalline framework structure as the target zeolite framework for production. For example: for MFI zeolites, suitable seed materials include ZSM-5 (MFI), ZSM-8 (MFI), ZSM-11 (MEL) and Silicalite-1 (MFI); for beta zeolites, other beta zeolites are used as seed materials; for mordenite zeolites, other mordenite zeolites are used as seed materials; for FAU zeolites, suitable seed materials are zeolite Y, zeolite X, USY zeolite, faujasite zeolite or small protozeolitic species (gels). Functions of the seeds can include, but are not limited to: supporting growth on the surface of the seed, that is, where crystallization does not undergo nucleation but rather crystal growth is directly on the surface of the seed; the parent gel and seed share common larger composite building units; the parent gel and seed share common smaller units, for instance 4 member rings; seeds that undergo partial dissolution to provide a surface for crystal growth of a zeolite; crystallization occurs through a "core-shell" mechanism with the seed acting as a core and the target material grows on the surface; and/or where the seeds partially dissolve providing essential building units that can orientate zeolite crystallization.

In certain embodiments, in which the WS-ODSO component in the initial synthesis, or supernatant in subsequent syntheses, does not provide sufficient alkaline agent, a hydroxide mineralizer is included as the hydroxide derived from the alkali metal source from the Periodic Table IUPAC Group 1 alkaline metals (and/or from the hydroxide of any hydroxide-containing structure directing agent). For example, these are selected from the group consisting of NaOH, KOH, RbOH, LiOH, CsOH and combinations thereof. In certain embodiments a Na-based hydroxide mineralizer is selected.

Note that the alkali metal source in the overall sol-gel, whether provided from the WS-ODSO component as a pH-modified WS-ODSO composition, from supernatant, or from a separate added mineralizer, is provide as a hydroxide, but in embodiments herein where the ratio is expressed based on the mass of the alkali, it is the metal itself. For instance, when the alkali is NaOH, the WS-ODSO/Na ratio is determined by dividing the mass of the WS-ODSO by the mass of the Na portion of NaOH, that is, about 57.5% of the NaOH mass. In certain embodiments the basic components from the all sources are provided in effective amounts so as to maintain the homogeneous mixture at a pH level of greater than or equal to about 9, for example in the range of about 9-14, 9-13, 10-14, 10-13, 11-14 or 11-13. It is appreciated that the overall pH is influenced by anions from the WS-ODSO component as a pH-modified WS-ODSO composition, an optional hydroxide mineralizer source, and in certain embodiments anions from other sources such as from an alumina source or a silica source. In certain embodiments hydroxide anions are provided from the WS-ODSO component as a pH-modified WS-ODSO composition, an optional mineralizer from an alkali metal source and an optional structure directing agent. In the process herein, the pH is reduced by the presence of WS-ODSO, therefore, the quantity of the basic compound from one or more of the aforementioned sources can be adjusted accordingly to attain the requisite pH.

The mixing steps typically occur at ambient temperature and pressure (for instance about 20° C. and about 1 standard atmosphere), for a time is sufficient to realize a homogeneous distribution of the components. In certain embodiments the sol-gel can be aged before being subjected to subsequent hydrothermal treatment, for example for a period of about 0-48, 0-24, 0-5, 0.5-24 or 0.5-5 hours. Hydrothermal treatment is then carried out at a temperature in the range of about 100-200, 100-180, 100-160, 120-200, 120-180, 120-160 or 140-200° C. and at atmospheric or autogenous pressure (from the sol-gel or from the sol-gel plus an addition of a gas purge into the vessel prior to heating), and for a time period within the range of about 0.1-7, 0.2-7, 0,1-6, 0.2-6, 0.1-5 or 0.2-5 days, to ensure crystallization and formation of a zeolite gel. As is known, these time periods and temperatures can vary depending on the desired zeolite framework to be produced.

The products are washed, for example with water at a suitable quantity, for example at about twice the volume of the sol-gel solution. The wash can be at a temperature of from about 20-80° C. at atmospheric, vacuum or under pressure. The wash can continue until the pH of the filtrate approaches about 7-9. The solids are recovered by filtration, for instance, using known techniques such as centrifugation, gravity, vacuum filtration, filter press, or rotary drums, and dried, for example at a temperature of up to about 110 or 150° C.

In optional embodiments in which calcination is carried out on zeolite produce, conditions for calcination can include temperatures in the range of about 450-700, 450-600, 500-700 or 500-600° C., atmospheric pressure, and a time period of about 3-24, 3-18, 6-24 or 6-18 hours. Calcining can occur with ramp rates in the range of from about 0.1-10, 0.1-5, 0.1-3, 1-10, 1-5 or 1-3° C. per minute. In certain embodiments calcination can have a first step ramping to a temperature of between about 100-150° C. with a holding time of from about 2-24 hours (at ramp rates of from about 0.1-5, 0.1-3, 1-5 or 1-3° C. per min) before increasing to a higher temperature with a final holding time in the range of about 2-24 hours.

ODSO

The present disclosure includes one or more WS-ODSO components, as a WS-ODSO composition or pH-modified WS-ODSO composition, including WS-ODSO compounds that are used as a component in a material synthesis process, wherein supernatant containing one or more WS-ODSO compounds is recycled to one or more subsequent material syntheses processes. In the description herein, the terms "oxidized disulfide oil", "ODSO", "ODSO mixture" and "ODSO compound(s)" may be used interchangeably for convenience. As used herein, the abbreviations of oxidized disulfide oils ("ODSO") and disulfide oils ("DSO") will be understood to refer to the singular and plural forms, which may also appear as "DSO compounds" and "ODSO compounds," and each form may be used interchangeably. In certain instances, a singular ODSO compound may also be referenced.

An initial composition of one or more WS-ODSO compounds can be used in an initial synthesis process as-is, or a composition of one or more WS-ODSO compounds can be subjected to pH-modification as described herein. The composition of one or more WS-ODSO compounds has a pH of less than 7, less than or equal to 4, or less than or equal to 1. In certain embodiments, a pH-modified WS-ODSO composition is provided comprising one or more WS-ODSO compounds and an effective amount of an alkaline agent.

A pH-modified WS-ODSO composition comprises an alkaline agent that can be a suitable basic component that, when added to the WS-ODSO component, results in an increase in the pH value of a resulting solution. Typically, an alkaline agent is provided as an aqueous basic solution, for example having concentrations in the range of about 1-99, 1-70, 1-50, 5-99, 5-70, 5-50, 10-99, 10-70 or 1-50 mass percent of base compounds. In certain embodiments the WS-ODSO is provided in an aqueous medium, there is sufficient water to dissolve an alkaline agent provided in anhydrous form.

The amount of alkaline is provided that is sufficient, on a mole to mole basis, to produce a composition of WS-ODSO and alkaline agent having a pH value that is greater than the pH value of the initial WS-ODSO mixture, in certain embodiments to a pH that is neutral (7) or approximately neutral. It is to be appreciated that this is expressed herein in an embodiment as a mass percent, but that can vary based on factors including but not limited to the specific composition of the ODSO mixture and the concentration and selection of the alkaline agent.

In certain embodiments, an effective amount of the alkaline agent is added produce a composition of WS-ODSO and alkaline agent having a pH value that is greater than the pH value of the initial WS-ODSO mixture; for example, an effective amount in such embodiments 10-99% of a molar equivalent to number of acid sites of the total WS-ODSO. In such a manner, the pH of the produced aqueous solution of WS-ODSO and alkaline agent can be tailored to a particular end-use, for instance with a pH curve developed with empirical data for a given WS-ODSO composition and a selected alkaline agent.

In certain embodiments, an effective amount of the alkaline agent is added produce a composition of WS-ODSO and alkaline agent having a pH value that is neutral or approximately neutral. In certain embodiments, an effective amount of the alkaline agent is added produce a composition of WS-ODSO and alkaline agent having a pH value that is in the range of about 6-8, 6.5-7.5, 6.8-7.2, 6.9-7.1 or 7. For example, an effective amount of alkaline agent used can be such that the hydronium ions in the system must have a concentration between about $10^{-6}$ to $10^{-6}$ molar (M). For instance, for a WS-ODSO composition derived from controlled catalytic oxidation of DSO compounds from a MEROX process, the composition of WS-ODSO and alkaline agent comprises about 18.4 to 18.5 mass percent of alkaline agent (relative to the mass of the total composition) to attain a pH in the range of about 6-8.

In certain embodiments, an alkaline agent of a pH-modified WS-ODSO composition is a base selected from the group consisting of sodium hydroxide, calcium hydroxide, lithium hydroxide, strontium hydroxide, barium hydroxide, potassium hydroxide, cesium hydroxide, rubidium hydroxide, ammonia, ammonium hydroxide, lithium hydroxide, zinc hydroxide, trimethylamine, pyridine, beryllium hydroxide, magnesium hydroxide, and mixtures thereof. In certain embodiments, an alkaline agent of a pH-modified WS-ODSO composition is a strong base, for example, selected from the group consisting of sodium hydroxide, calcium hydroxide, lithium hydroxide, strontium hydroxide, barium hydroxide, potassium hydroxide, cesium hydroxide, rubidium hydroxide, and mixtures thereof. In certain embodiments, an alkaline agent of a pH-modified WS-ODSO composition herein is a weak base, selected from the group consisting of ammonia, ammonium hydroxide, lithium hydroxide, zinc hydroxide, trimethylamine, pyridine, and mixtures thereof. In certain embodiments, other bases can be used as an alkaline agent in the methods and compositions herein, for example selected from the group consisting of beryllium hydroxide, magnesium hydroxide, and mixtures thereof. In certain embodiments, an alkaline agent in the methods and compositions herein is selected from the group consisting of sodium hydroxide, potassium hydroxide, ammonium hydroxide and mixtures thereof. In certain embodiments, an alkaline agent in the methods and compositions herein is selected from the group consisting of sodium hydroxide, potassium hydroxide, rubidium hydroxide, lithium hydroxide, cesium hydroxide, and mixtures thereof.

A pH-modified WS-ODSO composition generally has a pH value greater than that of the initial WS-ODSO composition. In certain embodiments a pH-modified WS-ODSO composition is neutral or approximately neutral in pH. In certain embodiments a pH-modified WS-ODSO composition has a pH in the range of about 6-8, 6.5-7.5, 6.8-7.2, 6.9-7.1 or 7. In certain embodiments a pH-modified WS-ODSO composition comprises deacidified WS-ODSO that has an acidic pH that is higher than that of the initial WS-ODSO; for example, if the initial WS-ODSO has a pH of 1, the deacidified WS-ODSO has a pH of 1.1 or greater, up to about neutral, for example 1.1-8, 1.1-7.5, 1.1-7.0, 1.1-6.9 or 1.1-6.5. In certain embodiments the composition comprises basified WS-ODSO that has a basic pH, for instance greater than 7, 8, 9 or 10, for example 7.1-14, 7.5-14 or 8-14. The selection of the pH value of the pH-modified WS-ODSO composition depends on the type of material being produced, what components are being replaced as related to conventional synthesis, and other factors.

In certain embodiments, WS-ODSO used in a pH-modified WS-ODSO composition contains a first weight percent of atomic sulfur, and the pH-modified WS-ODSO composition contains a lesser weight percent of atomic sulfur than the first quantity of atomic sulfur. In certain embodiments, the initial WS-ODSO used in the pH-modified WS-ODSO composition contains a first weight percent of atomic alkali metal, and the pH-modified WS-ODSO composition contains a greater weight percent of atomic alkali metal than the first quantity of atomic alkali metal.

In certain embodiments, the one or more WS-ODSO compounds are contained in a mixture with one or more catalytically active components and WS-ODSO, as an active component carrier composition (as disclosed in co-pending and commonly owned U.S. application Ser. No. 17/720,434 filed Apr. 14, 2022, entitled "Active Component Carrier Composition, and Method for Manufacture of Catalyst Materials," which is incorporated by reference herein in its entirety). One or more catalytically active components are included in a mixture with one or more WS-ODSO compounds. The one or more active components can vary, depending upon the application of the catalyst being manufactured. The active component can be a metal or a non-metal, in elemental form or as a compound such as oxides, carbides or sulfides. For instance, one or more active components for hydrotreating catalysts can include one or more metals or metal compounds selected from the Periodic Table of the Elements IUPAC Groups 4-12. In certain embodiments one or more active components are selected for producing hydrotreating catalysts and can include one or more metals or metal compounds selected from the Periodic Table of the Elements IUPAC Groups 6-10 (for example Co, Ni, Mo, and combinations thereof). In certain embodiments one or more active components are selected for producing hydrocracking catalysts and can include one or more metals or metal compounds selected from the Periodic Table of the Elements IUPAC Groups 6-10 (for example Co, Ni, W, Mo, and combinations thereof). In certain embodiments one or more active components are selected for producing catalytic reforming catalysts and can include one or more metals or metal compounds selected from the Periodic Table of the Elements IUPAC Groups 8-10 (for example Pt or Pd). In certain embodiments one or more active components are selected for producing hydrogenation catalysts and can include one or more metals or metal compounds selected from the Periodic Table of the Elements IUPAC Groups 7-10 (for example Pt or Pd), and/or one or more non-metal compound such as P. In certain embodiments one or more active components are selected for producing oxidation catalysts and can include one or more metals or metal compounds selected from the Periodic Table of the Elements IUPAC Groups 4-10 (for example Ti, V, Mn, Co, Fe, Cr and Mo) or from the Periodic Table of the Elements IUPAC Groups 4-12 (for example Ti, V, Mn, Co, Fe, Cr, Cu, Zn, W, Mo).

In certain embodiments, active component(s) in the WS-ODSO mixture are carried over from the preceding catalytic oxidation of MEROX process by-products DSO, and accordingly the concentration depends on the amount used therein. In certain embodiments, catalytic oxidation of MEROX process by-products DSO can occur with an increased amount of oxidation catalyst compared with that which is typically used, wherein excess is passed with the ODSO or WS-ODSO fraction and used herein as active components in the WS-ODSO mixture herein.

In certain embodiments, the produced aqueous liquid mixture comprises one or more WS-ODSO compounds that are contained in reaction products, or a fraction of reaction products, derived from controlled catalytic oxidation of disulfide oil compounds in the presence of an oxidation catalyst containing one or more transition metals. For example, as described above and in commonly owned U.S. Pat. No. 10,807,947 which is incorporated by reference herein in its entirety, a controlled catalytic oxidation of MEROX process by-products DSO can be carried out. The resulting oxidized effluents contain ODSO. As disclosed in U.S. Pat. No. 10,807,947, the by-product DSO compounds from the mercaptan oxidation process can be oxidized, typically in the presence of a catalyst. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. In embodiments herein, a catalyst is used in the oxidation process. The oxidation catalyst can contain one active metals from IUPAC Groups 4-10 or from Groups 4-12 of the Periodic Table. In certain embodiments oxidation catalyst are metals or metal compounds containing one or more transition metals. In certain embodiments oxidation catalyst are metals or metal compounds containing one or more metals selected from the group consisting of Ti, V, Mn, Co, Fe, Cr, Cu, Zn, W, Mo and combinations thereof. In certain embodiments oxidation catalyst are compounds containing one or more metals or metal compounds selected from the group consisting of Mo, W, V, Ti, and combinations thereof. In certain embodiments oxidation catalyst are compounds containing one or more metals or metal compounds selected from the group consisting of Mo (VI), W (VI), V (V), Ti (IV), and combinations thereof. In certain embodiments, suitable homogeneous catalysts include molybdenum acetylacetonate, bis(acetylacetonate) dioxomolybdenum, molybdenum naphthenate, molybdenum hexacarbonyl, tungsten hexacarbonyl, sodium tungstate and vanadium pentoxide. In certain embodiments, a suitable catalyst is sodium tungstate, $Na_2WO_4 \cdot 2H_2O$.

In certain embodiments, the initial WS-ODSO used in the pH-modified WS-ODSO composition contains a first weight percent of active component(s) including metals such as transition metals, and the pH-modified WS-ODSO composition contains a lesser weight percent of active component(s) than the first quantity of active component(s).

In certain embodiments WS-ODSO is obtained from controlled catalytic oxidation of disulfide oils from mercaptan oxidation processes. The effluents from controlled catalytic oxidation of disulfide oils from mercaptan oxidation processes includes ODSO compounds and in certain embodiments DSO compounds that were unconverted in the oxidation process. In certain embodiments this effluent contains water-soluble compounds and water-insoluble compounds. The effluent contains at least one ODSO compound, or a mixture of two or more ODSO compounds, selected from the group consisting of compounds having the general formula (R—SO—S—R'), (R—SOO—S—R'), (R—SOO—SO—R'), (R—SOO—SOO—R'), (R—SO—SO—R'), (R—SO—SOO—OH), (R—SOO—SOO—OH), (R—SO—SO—OH), (R—SOO—SO—OH), (R'—SO—SO—OR), (R'—SOO—SO—OR), (R'—SO—SOO—OR) and (R'—SOO—SOO—OR). In certain embodiments, in the above formulae R and R' are C1-C10 alkyl or C6-C10 aryl. It will be understood that since the source of the DSO is a refinery feedstream, the R and R' substituents vary, e.g., methyl and ethyl subgroups, and the number of sulfur atoms, S, in the as-received feedstream to oxidation can extend to 3, for example, trisulfide compounds.

In embodiments herein the water-soluble compounds and water-insoluble compounds are separated from one another, and WS-ODSO used herein comprises all or a portion of the water-soluble compounds separated from the total effluents from oxidation of disulfide oils from mercaptan oxidation processes. For example, the different phases can be separated by decantation or partitioning with a separating funnel, separation drum, by decantation, or any other known apparatus or process for separating two immiscible phases from one another. In certain embodiments, the water-soluble and water-insoluble components can be separated by distillation as they have different boiling point ranges. It is understood that there will be crossover of the water-soluble and water-insoluble components in each fraction due to solubility of components, typically in the ppmw range (for instance, about 1-10,000, 1-1,000, 1-500 or 1-200 ppmw). In certain embodiments, contaminants from each phase can be removed, for example by stripping or adsorption.

In certain embodiments WS-ODSO used herein comprises, consists of or consists essentially of at least one WS-ODSO compound having 3 or more oxygen atoms that is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR). In certain embodiments WS-ODSO used herein comprises, consists of or consists essentially of a mixture or two or more WS-ODSO compounds having 3 or more oxygen atoms, that is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR). In certain embodiments WS-ODSO used herein comprises, consists of or consists essentially of WS-ODSO compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), and mixtures thereof. In certain embodiments, in the above formulae R and R' are C1-C10 alkyl or C6-C10 aryl. In certain embodiments, the R and R' are methyl and/or ethyl groups. In certain embodiments, the WS-ODSO compound(s) used herein have 1 to 20 carbon atoms.

In certain embodiments, the WS-ODSO compounds used herein comprise, consist of or consist essentially of ODSO compounds having an average density greater than about 1.0 g/cc. In certain embodiments, the WS-ODSO compounds used herein comprise, consist of or consist essentially of ODSO compounds having an average boiling point greater than about 80° C. In certain embodiments, the WS-ODSO compounds used herein comprise, consist of or consist essentially of ODSO compounds having a dielectric constant that is less than or equal to 100 at 0° C.

Table 1 includes examples of polar WS-ODSO compounds that contain 3 or more oxygen atoms. In certain embodiments the identified ODSO compounds are obtained from a water-soluble fraction of the effluents from oxidation of DSO obtained from MEROX by-products. The ODSO compounds that contain 3 or more oxygen atoms are water-soluble over effectively all concentrations, for instance, with some minor amount of acceptable tolerance for carry over components from the effluent stream and in the water insoluble fraction with 2 oxygen atoms of no more than about 1, 3 or 5 mass percent.

In certain embodiments the WS-ODSO compounds contained in an oxidation effluent stream that is derived from controlled catalytic oxidation of MEROX process by-products, DSO compounds, as disclosed in U.S. Pat. Nos. 10,807,947 and 10,781,168 and as incorporated herein by reference above.

In some embodiments, the WS-ODSO are derived from oxidized DSO compounds present in an effluent refinery hydrocarbon stream recovered following the catalytic oxidation of mercaptans present in the hydrocarbon stream. In some embodiments, the DSO compounds are oxidized in the presence of a catalyst.

As noted above, the designation "MEROX" originates from the function of the process itself, that is, the conversion of mercaptans by oxidation. The MEROX process in all of its applications is based on the ability of an organometallic catalyst in a basic environment, such as a caustic, to accelerate the oxidation of mercaptans to disulfides at near ambient temperatures and pressures. The overall reaction can be expressed as follows:

$$RSH + \tfrac{1}{4}O_2 \rightarrow \tfrac{1}{2}RSSR + \tfrac{1}{2}H_2O \tag{1}$$

where R is a hydrocarbon chain that may be straight, branched, or cyclic, and the chains can be saturated or unsaturated. In most petroleum fractions, there will be a mixture of mercaptans so that the R can have 1, 2, 3 and up to 10 or more carbon atoms in the chain. This variable chain length is indicated by R and R' in the reaction. The reaction is then written:

$$2R'SH + 2RSH + O_2 \rightarrow 2R'SSR + 2H_2O \tag{2}$$

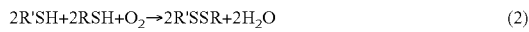

This reaction occurs spontaneously whenever any sour mercaptan-bearing distillate is exposed to atmospheric oxygen, but proceeds at a very slow rate. In addition, the catalyzed reaction (3) set forth above requires the presence of an alkali caustic solution, such as aqueous sodium hydroxide. The mercaptan oxidation proceeds at an economically practical rate at moderate refinery downstream temperatures.

The MEROX process can be conducted on both liquid streams and on combined gaseous and liquid streams. In the case of liquid streams, the mercaptans are converted directly to disulfides which remain in the product so that there is no reduction in total sulfur content of the effluent stream. The MEROX process typically utilizes a fixed bed reactor system for liquid streams and is normally employed with charge stocks having end points above 135° C.-150° C. Mercaptans are converted to disulfides in the fixed bed reactor system over a catalyst, for example, an activated charcoal impregnated with the MEROX reagent, and wetted with caustic solution. Air is injected into the hydrocarbon feedstream ahead of the reactor and in passing through the catalyst-impregnated bed, the mercaptans in the feed are oxidized to disulfides. The disulfides are substantially insoluble in the caustic and remain in the hydrocarbon phase. Post treatment is required to remove undesirable by-products resulting from known side reactions such as the neutralization of $H_2S$, the oxidation of phenolic compounds, entrained caustic, and others.

The vapor pressures of disulfides are relatively low compared to those of mercaptans, so that their presence is much less objectionable from the standpoint of odor; however, they are not environmentally acceptable due to their sulfur content and their disposal can be problematical.

In the case of mixed gas and liquid streams, extraction is applied to both phases of the hydrocarbon streams. The degree of completeness of the mercaptan extraction depends upon the solubility of the mercaptans in the alkaline solution, which is a function of the molecular weight of the individual mercaptans, the extent of the branching of the mercaptan molecules, the concentration of the caustic soda and the temperature of the system. Thereafter, the resulting DSO compounds are separated and the caustic solution is regenerated by oxidation with air in the presence of the catalyst and reused.

Figure 3:
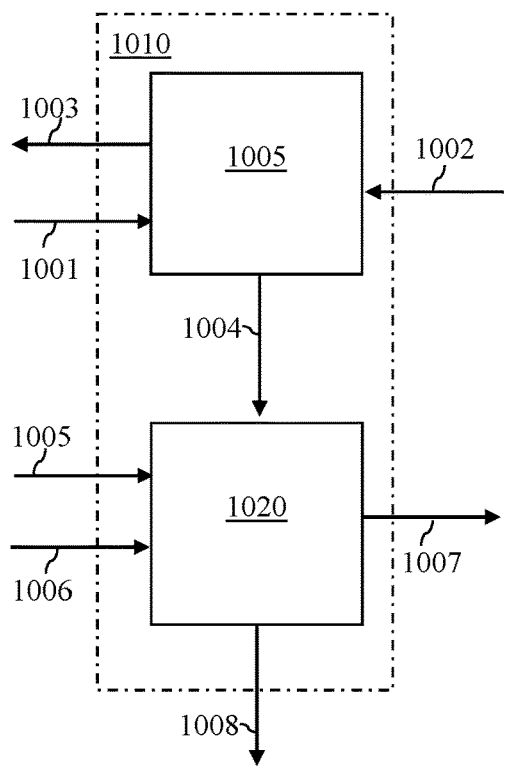
FIG. 3 is a simplified schematic diagram of a generalized version of a conventional mercaptan oxidation or MEROX process for the liquid-liquid extraction of a mercaptan containing hydrocarbon stream.

Referring to the attached drawings, FIG. 3 is a simplified schematic of a generalized version of a conventional MEROX process employing liquid-liquid extraction for removing sulfur compounds. A MEROX unit 1010, is provided for treating a mercaptan containing hydrocarbon stream 1001. In some embodiments, the mercaptan containing hydrocarbon stream 1001 is LPG, propane, butane, light naphtha, kerosene, jet fuel, or a mixture thereof. The process generally includes the steps of: introducing the hydrocarbon stream 1001 with a homogeneous catalyst into an extraction vessel 1005 containing a caustic solution 1002, in some embodiments, the catalyst is a homogeneous cobalt-based catalyst; passing the hydrocarbon catalyst stream in countercurrent flow through the extraction section of the extraction 1005 vessel in which the extraction section includes one or more liquid-liquid contacting extraction decks or trays (not shown) for the catalyzed reaction with the circulating caustic solution to convert the mercaptans to water-soluble alkali metal alkane thiolate compounds; withdrawing a hydrocarbon product stream 1003 that is free or substantially free of mercaptans from the extraction vessel 1005, for instance, having no more than about 1000, 100, 10 or 1 ppmw mercaptans; recovering a combined spent caustic and alkali metal alkane thiolate stream 1004 from the extraction vessel 1005; subjecting the spent caustic and alkali metal alkane thiolate stream 1004 to catalyzed wet air oxidation in a reactor 1020 into which is introduced catalyst 1005 and air 1006 to provide the regenerated spent caustic 1008 and convert the alkali metal alkane thiolate compounds to disulfide oils; and recovering a by-product stream 1007 of DSO compounds and a minor proportion of other sulfides such as mono-sulfides and tri-sulfides. The effluents of the wet air oxidation step in the MEROX process can comprise a minor proportion of sulfides and a major proportion of disulfide oils. As is known to those skilled in the art, the composition of this effluent stream depends on the effectiveness of the MEROX process, and sulfides are assumed to be carried-over material. A variety of catalysts have been developed for the commercial practice of the process. The efficiency of the MEROX process is also a function of the amount of $H_2S$ present in the stream. It is a common refinery practice to install a prewashing step for $H_2S$ removal.

An enhanced MEROX process ("E-MEROX") is a modified MEROX process where an additional step is added, in which DSO compounds are oxidized with an oxidant in the presence of a catalyst to produce a mixture of ODSO compounds. The by-product DSO compounds from the mercaptan oxidation process are oxidized, in some embodiments in the presence of a catalyst, and constitute an abundant source of ODSO compounds that are sulfoxides, sulfonates, sulfinates, sulfones and their corresponding di-sulfur mixtures. The disulfide oils having the general formula RSSR' (wherein R and R' can be the same or different and can have 1, 2, 3 and up to 10 or more carbon atoms) can be oxidized without a catalyst or in the presence of one or more catalysts to produce a mixture of ODSO compounds. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. If a catalyst is used in the oxidation of the disulfide oils having the general formula RSSR' to produce the ODSO compounds, it can be a heterogeneous or homogeneous oxidation catalyst. The oxidation catalyst can be selected from one or more heterogeneous or homogeneous catalyst comprising metals from the IUPAC Group 4-12 of the Periodic Table, including Ti, V, Mn, Co, Fe, Cr, Cu, Zn, W and Mo. The catalyst can be a homogeneous water-soluble compound that is a transition metal containing an active species selected from the group consisting of Mo (VI), W (VI), V (V), Ti (IV), and combinations thereof. In certain embodiments, suitable homogeneous catalysts include molybdenum naphthenate, sodium tungstate, molybdenum hexacarbonyl, tungsten hexacarbonyl, sodium tungstate and vanadium pentoxide. An exemplary catalyst for the controlled catalytic oxidation of MEROX process by-products DSO is sodium tungstate, $Na_2WO_4 \cdot 2H_2O$. In certain embodiments, suitable heterogeneous catalysts include Ti, V, Mn, Co, Fe, Cr, W, Mo, and combinations thereof deposited on a support such as alumina, silica-alumina, silica, natural zeolites, synthetic zeolites, and combinations comprising one or more of the above supports.

The oxidation of DSO typically is carried out in an oxidation vessel selected from one or more of a fixed-bed reactor, an ebullated bed reactor, a slurry bed reactor, a moving bed reactor, a continuous stirred tank reactor, and a tubular reactor. The ODSO compounds produced in the E-MEROX process generally comprise two phases: a water-soluble phase and water-insoluble phase, and can be separated into the aqueous phase containing WS-ODSO compounds and a non-aqueous phase containing water-insoluble ODSO compounds. The E-MEROX process can be tuned depending on the desired ratio of water-soluble to water-insoluble compounds presented in the product ODSO mixture. Partial oxidation of DSO compounds results in a higher relative amount of water-insoluble ODSO compounds present in the ODSO product and a near or almost complete oxidation of DSO compounds results in a higher relative amount of WS-ODSO present in the ODSO product. Details of the ODSO compositions are discussed in the U.S. Pat. No. 10,781,168, which is incorporated herein by reference above.

Figure 4:
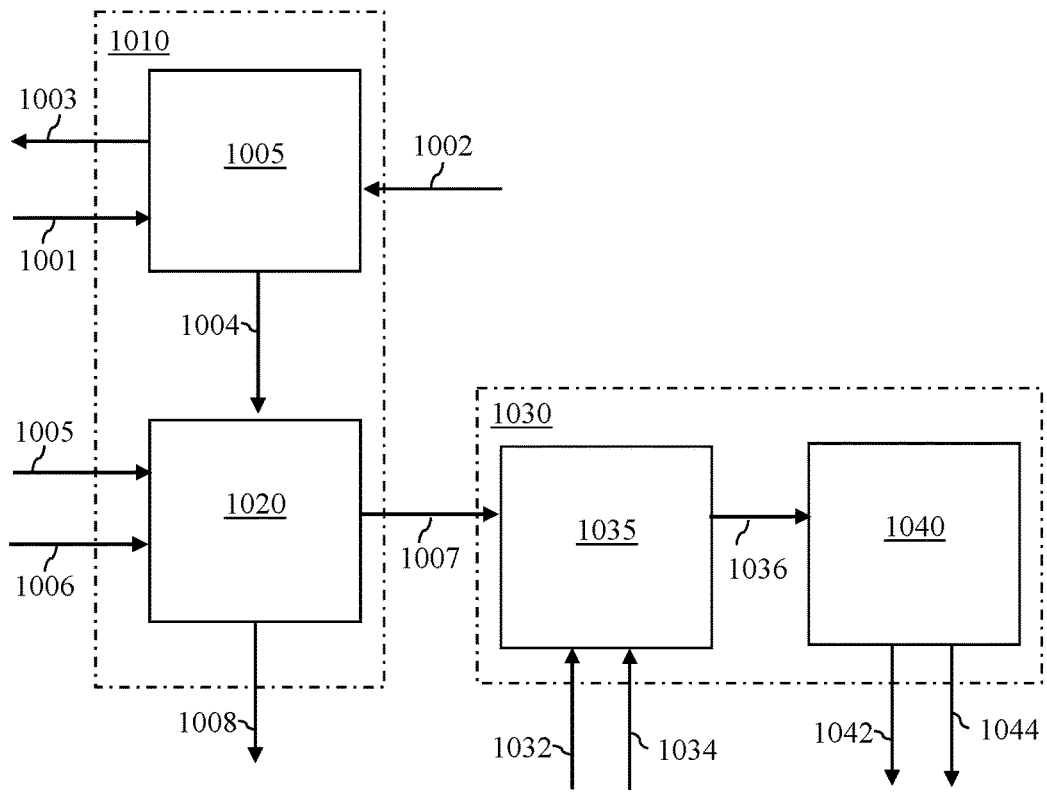
FIG. 4 is a simplified schematic diagram of a generalized version of an enhanced mercaptan oxidation or E-MEROX process.

FIG. 4 is a simplified schematic of an E-MEROX process that includes E-MEROX unit 1030. The MEROX unit 1010 unit operates similarly as in FIG. 3, with similar references numbers representing similar units/feeds. In FIG. 4, the effluent stream 1007 from the generalized MEROX unit of FIG. 3 is treated. It will be understood that the processing of the mercaptan containing hydrocarbon stream of FIG. 3 is illustrative only and that separate streams of the products, and combined or separate streams of other mixed and longer chain products can be the subject of the process for the recovery and oxidation of DSO to produce ODSO compounds, that is the E-MEROX process. In order to practice the E-MEROX process, apparatus are added to recover the by-product DSO compounds from the MEROX process. In addition, a suitable reactor 1035 add into which the DSO compounds are introduced in the presence of a catalyst 1032 and an oxidant 1034 and subjecting the DSO compounds to a catalytic oxidation step to produce the mixed stream 1036 of water and ODSO compounds. A separation vessel 1040 is provided to separate the by-product 1044 from the ODSO compounds 1042.

The oxidation to produce OSDO can be carried out in a suitable oxidation reaction vessel operating at a pressure in the range from about 1-30, 1-10 or 1-3 bars. The oxidation to produce OSDO can be carried out at a temperature in the range from about 20-300, 20-150, 20-90, 45-300, 15-150 or 45-90° C. The molar feed ratio of oxidizing agent-to-monosulfur can be in the range of from about 1:1 to 100:1, 1:1 to 30:1 or 1:1 to 4:1. The residence time in the reaction vessel can be in the range of from about 5-180, 5-90, 5-30, 15-180, 15-90 or 5-30 minutes. In certain embodiments, oxidation of DSO is carried out in an environment without added water as a reagent. The by-products stream 1044 generally comprises wastewater when hydrogen peroxide is used as the oxidant. Alternatively, when other organic peroxides are used as the oxidant, the by-products stream 1044 generally comprises the alcohol of the peroxide used. For example, if butyl peroxide is used as the oxidant, the by-product alcohol 1044 is butanol.

In certain embodiments WS-ODSO compounds are passed to a fractionation zone (not shown) for recovery following their separation from the wastewater fraction. The fractionation zone can include a distillation unit. In certain embodiments, the distillation unit can be a flash distillation unit with no theoretical plates in order to obtain distillation cuts with larger overlaps with each other or, alternatively, on other embodiments, the distillation unit can be a flash distillation unit with at least 15 theoretical plates in order to have effective separation between cuts. In certain embodiments, the distillation unit can operate at atmospheric pressure and at a temperature in the range of from 100° C. to 225° C. In other embodiments, the fractionation can be carried out continuously under vacuum conditions. In those embodiments, fractionation occurs at reduced pressures and at their respective boiling temperatures. For example, at 350 mbar and 10 mbar, the temperature ranges are from 80° C. to 194° C. and 11° C. to 98° C., respectively. Following fractionation, the wastewater is sent to the wastewater pool (not shown) for conventional treatment prior to its disposal. The wastewater by-product fraction can contain a small amount of water-insoluble ODSO compounds, for example, in the range of from 1 ppmw to 10,000 ppmw. The wastewater by-product fraction can contain a small amount of water-soluble ODSO compounds, for example, in the range of from 1 ppmw to 50,000 ppmw, or 100 ppmw to 50,000 ppmw. In embodiments where alcohol is the by-product alcohol, the alcohol can be recovered and sold as a commodity product or added to fuels like gasoline. The alcohol by-product fraction can contain a small amount of water-insoluble ODSO compounds, for example, in the range of from 1 ppmw to 10,000 ppmw. The alcohol by-product fraction can contain a small amount of water-soluble ODSO compounds, for example, in the range of from 100 ppmw to 50,000 ppmw.

EXAMPLES

Figure 5A:
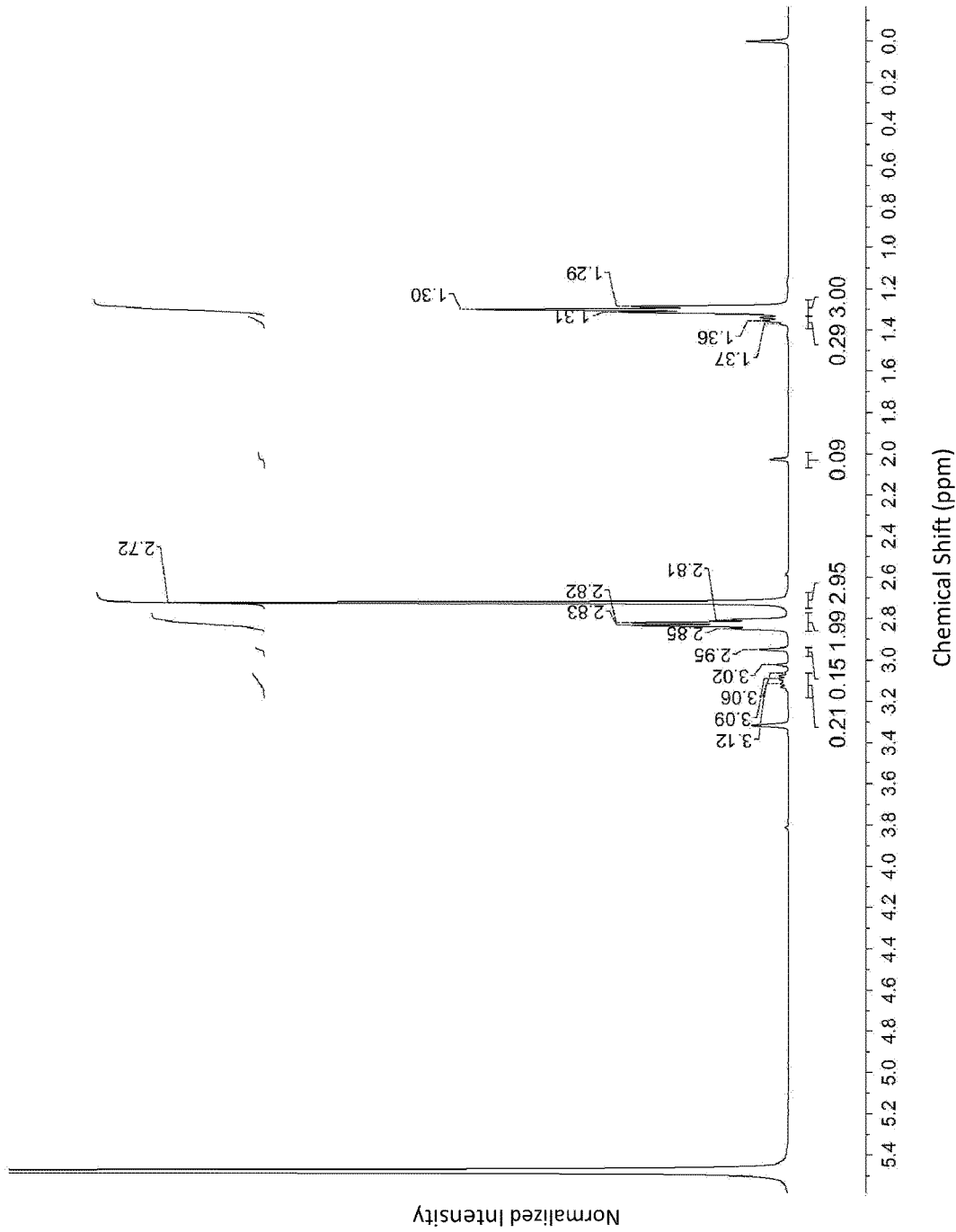
FIG. 5A is the experimental $^1$H NMR spectrum of the WS-ODSO material prior to pH-modification in an Example herein.
Figure 5B:
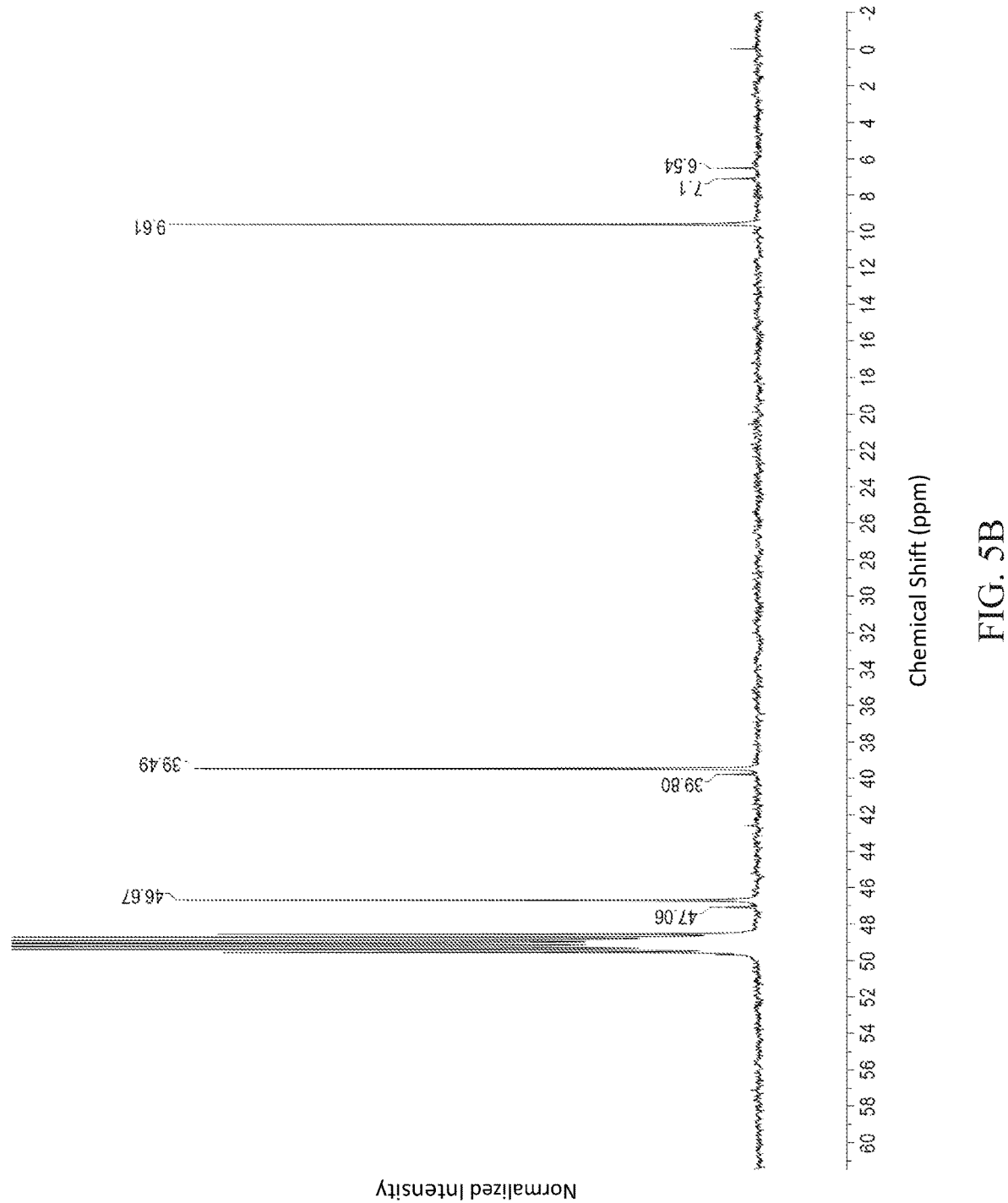
FIG. 5B is the experimental $^{13}$C $\{^1$H$\}$ NMR spectrum of the WS-ODSO material prior to pH-modification in an Example herein.

Reference Example 1: The ODSO mixtures used in the Examples below were produced as disclosed in U.S. Pat. No. 10,781,168, incorporated by reference above, and in particular the fraction referred to therein as Composition 2. Catalytic oxidation a hydrocarbon refinery feedstock having 98 mass percent of C1 and C2 disulfide oils was carried out per R group. The oxidation of the DSO compounds was performed in batch mode under reflux at atmospheric pressure, that is, approximately 1.01 bar. The hydrogen peroxide oxidant was added at room temperature, that is, approximately 23° C. and produced an exothermic reaction. The molar ratio of oxidant-to-DSO compounds (calculated based upon mono-sulfur content) was 2.90. After the addition of the oxidant was complete, the reaction vessel temperature was set to reflux at 80° C. for approximately one hour after which the WS-ODSO was produced for use in the examples herein (referred to as Composition 2 in U.S. Pat. No. 10,781,168) and isolated after the removal of water. The catalyst used in the oxidation of the DSO compounds was sodium tungstate. FIG. 5A is the experimental $^1$H NMR spectrum of the polar WS-ODSO mixture used in the example herein prior to neutralization, and FIG. 5B is the experimental $^{13}$C {$^1$H} NMR spectrum of the polar WS-ODSO mixture that used in the example herein prior to neutralization. The selected water soluble ODSO fraction was mixed with a CD$_3$OD solvent and the spectrum was taken at 25° C. Methyl carbons have a positive intensity while methylene carbons exhibit a negative intensity. The peaks in the 48-50 ppm region belong to carbon signals of the CD$_3$OD solvent.

When comparing the experimental $^{13}$C {$^1$H} NMR spectrum of FIG. 5B for the WS-ODSO fraction with a saved database of predicted spectra, it was found that a combination of the predicted alkyl-sulfoxidesulfonate (R—SO—SOO—OH), alkyl-sulfonesulfonate (R—SOO—SOO—OH), alkyl-sulfoxidesulfinatei (R—SO—SO—OH) and alkyl-sulfonesulfinate (R—SOO—SO—OH) most closely corresponded to the experimental spectrum. This suggests that alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) are major compounds in the WS-ODSO fraction. It is clear from the NMR spectra shown in FIGS. 5A and 5B that the WS-ODSO fraction comprises a mixture of ODSO compounds that form a WS-ODSO component of a neutralized composition of the present disclosure.

Figure 6A:
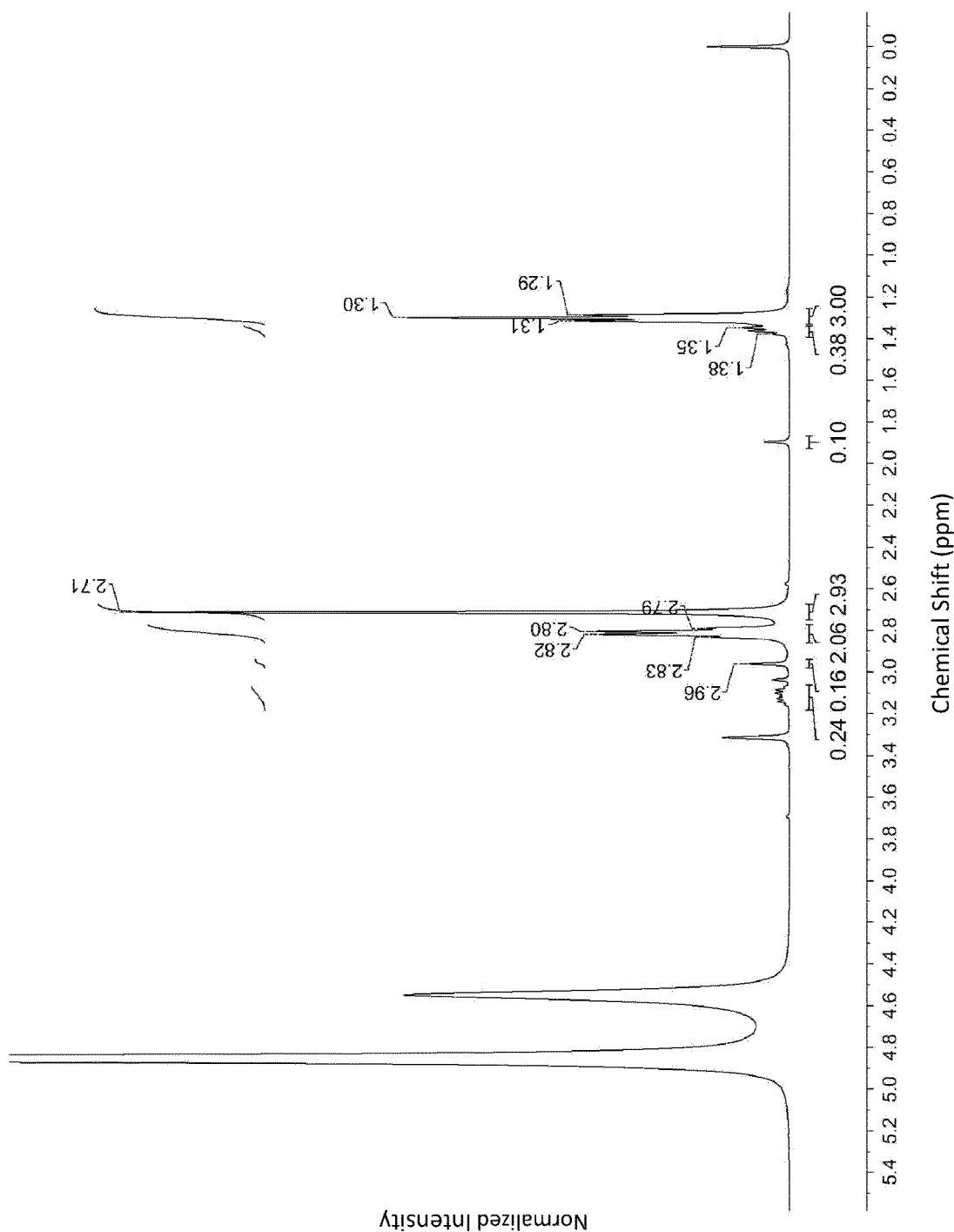
FIG. 6A is the experimental $^1$H-NMR spectrum of a neutralized WS-ODSO fraction in Reference Example 2 herein.
Figure 6B:
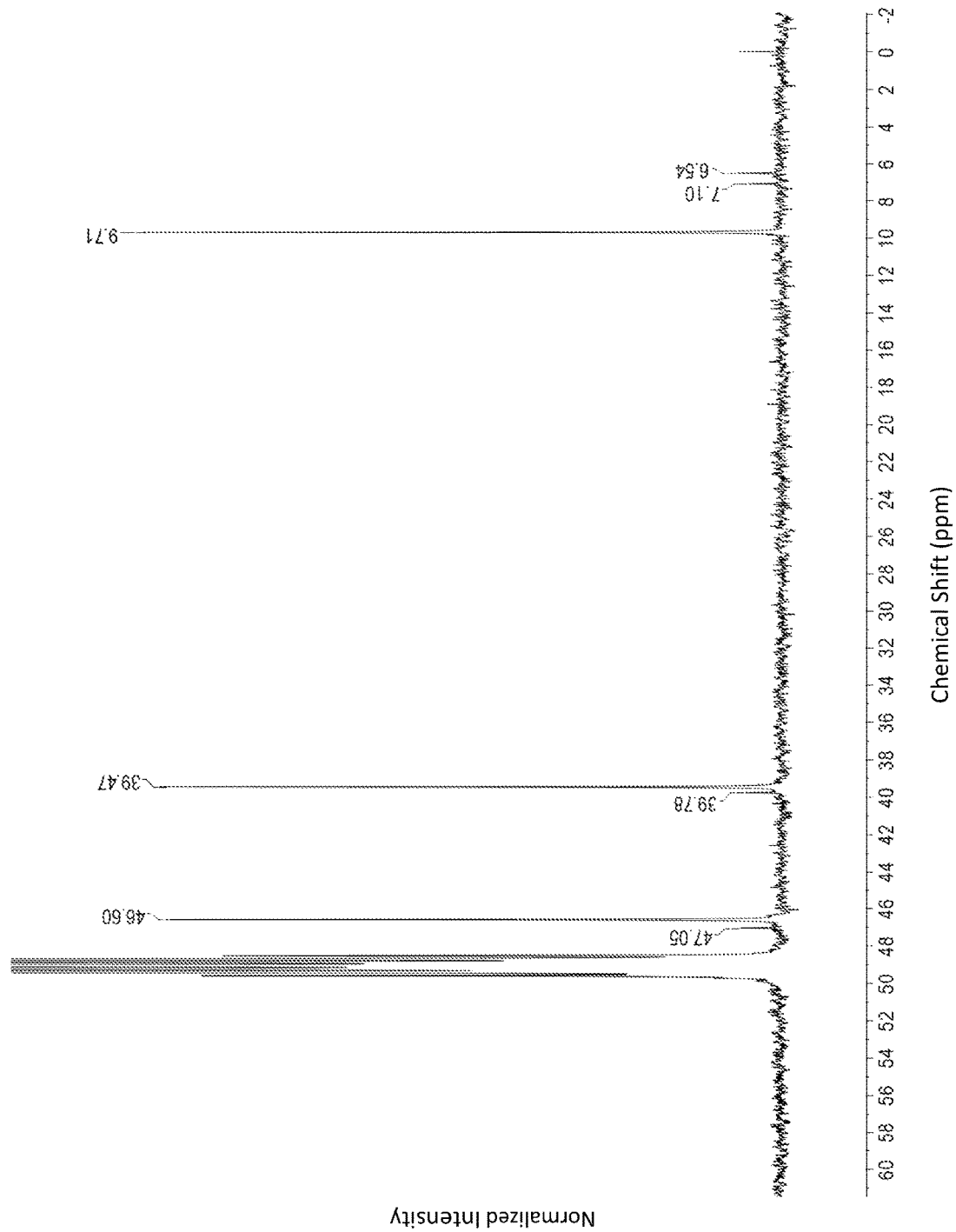
FIG. 6B is the experimental $^{13}$C $\{^1$H$\}$ NMR spectrum of a neutralized WS-ODSO fraction in Reference Example 2 herein.
Figure 7:
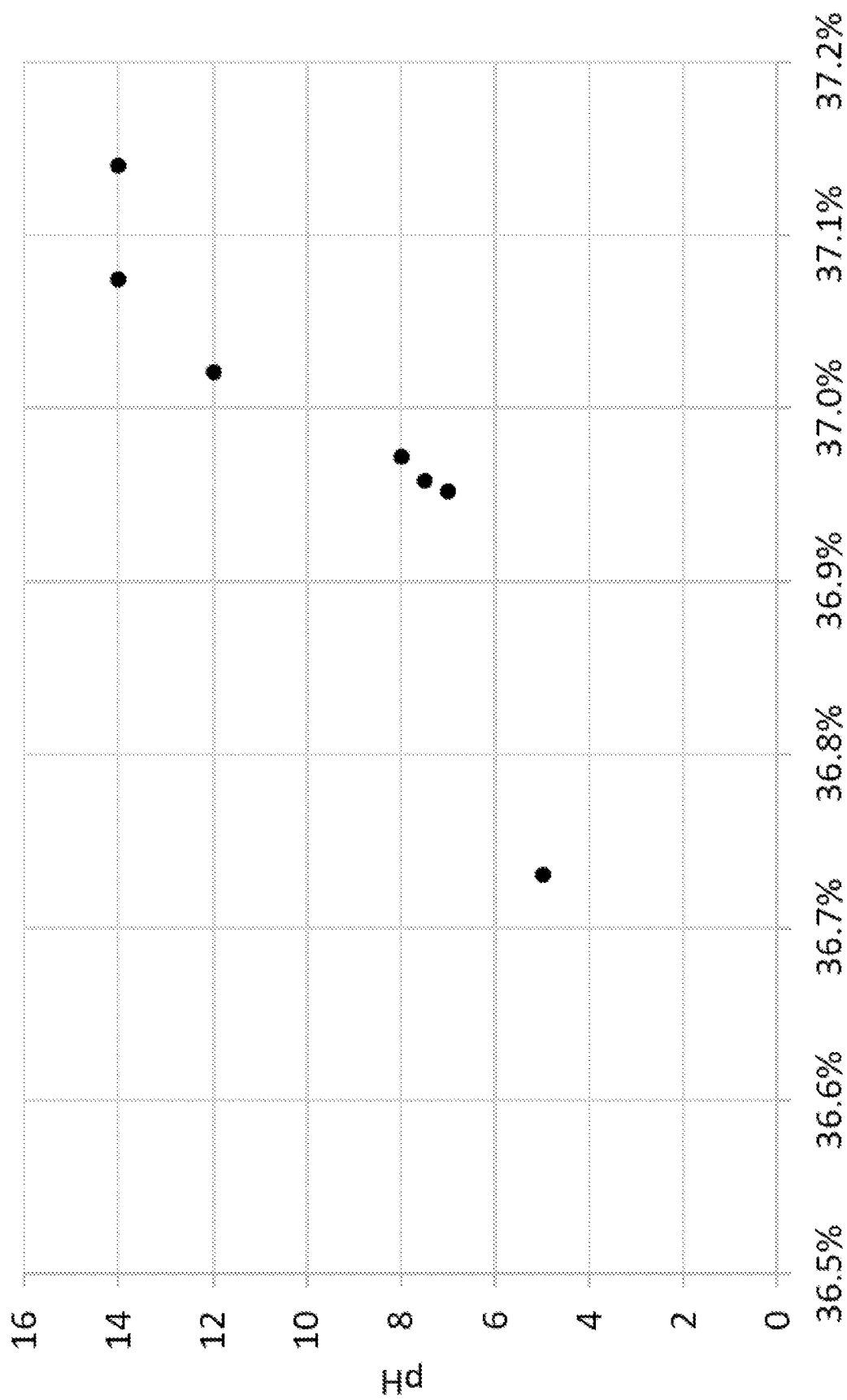
FIG. 7 is a neutralization curve of WS-ODSO as a function of the quantity of alkaline agent in Reference Example 2 herein.

Reference Example 2: The selected WS-ODSO fraction as described in the Reference Example 1 was neutralized. The selected WS-ODSO tested with pH paper produced by VWR International (VWR International, Radnor, PA, USA) and determined to have a pH of approximately 0 or below. To a quantity of 50.6028 g of this WS-ODSO, an alkaline agent (50 mass percent aqueous NaOH solution) was added slowly whilst measuring the pH. Gas liberation and heat generation were observed. At a pH of approximately 7, a solid was precipitated. FIG. 6A is the experimental $^1$H NMR spectrum of the liquid portion of the neutralized WS-ODSO composition, and FIG. 6B is the experimental $^{13}$C {$^1$H} NMR spectrum of the neutralized WS-ODSO composition. FIG. 7 shows the neutralization curve as a function of the mass percent of the NaOH reagent added to the total solution of NaOH reagent and WS-ODSO. This example shows that approximately 36.95 mass percent of 50 mass percent NaOH was required to neutralize the WS-ODSO, or approximately 18.5 mass percent NaOH relative to the total mass of the solution of WS-ODSO and the selected alkaline agent. The neutralized WS-ODSO at pH 7 from this Reference Example 2 was separated from the solid. Elemental analysis was performed using Inductively Coupled Plasma (ICP) spectroscopy. Table 2 provides ICP data in the form of the mass percent of Na, S and W in the WS-ODSO mixture before neutralization, the neutralized WS-ODSO at pH 7 and the solid precipitated from the neutralized WS-ODSO at pH 7.

$^1$H and $^{13}$C NMR data were obtained for the WS-ODSO FIG. 5A, $^1$H NMR spectrum, and FIG. 5B, $^{13}$C {$^1$H} NMR spectrum) and for the neutralized WS-ODSO at pH 7 (FIG. 6A, $^1$H NMR spectrum, and FIG. 6B, $^{13}$C {$^1$H} NMR spectrum). The samples were prepared in deuterated methanol using a JEOL 500 MHz spectrometer fitted with a 5 mm liquid-state Royal probe. The spectra and data show that the nature of the WS-ODSO components remain unchanged before and after neutralization. Proton NMR spectra and data show that the nature of the WS-ODSO components remain unchanged before and after neutralization, however, there is an observable change in the nature of the hydrogen bonded species. In FIG. 5A concerning the WS-ODSO prior to neutralization, the peak at approximately 5.5 ppm appears to be a coalescence of protons associated with deuterated methanol (the solvent used to measure the samples), water and other species. However, after neutralization (FIG. 6A) there is a clear peak observed at approximately 4.6 ppm that is expected for the protons from the deuterated methanol and a coalesced peak at approximately 4.9 ppm relating to water and other species. Hence, there is a clear difference of interaction between the two samples with the solvent used to measure the NMR data.

Example 1: A zeolite was synthesized using precursors and neutralized WS-ODSO as described in Reference Example 2 as a component, wherein the only source of mineralizer was from the neutralized WS-ODSO composition, and without added utility water. Aluminum nitrate nonahydrate (0.2638 g) was weighed into a 45 ml PTFE liner. Thereafter, 7.0477 g of a 20 wt. % TPAOH solution was added and the mixture stirred. Next, neutralized WS-ODSO from Reference Example 2 (3.3014 g) was added and the mixture was kept under stirring. The silica source, (5.2437 g, Ludox HS-40, 40 wt. %), was added and the mixture stirred until homogeneous. The PTFE liner was positioned within an autoclave and transferred to an oven and heated to a temperature of 175° C. whilst rotating the autoclave. The autoclave was kept at isothermal conditions for 18 hrs. Thereafter, the product was centrifuged and the mother liquor was decanted (pH 13-13.5 measured using a pH stick strip). Distilled water was added to the zeolite and the system re-dispersed using a shaker before centrifuging again. The system was repeated until the decanted solution approached pH 7. The zeolite was thereafter freeze-dried. The dry mass was 2.1009 g. As noted herein, X-ray diffraction identified the zeolite as ZSM-5.

Example 2: A zeolite was synthesized using mother liquor from Example 1 as a component, wherein mineralizer was from the mother liquor, in the absence of added mineralizer, and without added utility water. Aluminum nitrate nonahydrate (0.2629 g) was weighed into a 45 ml PTFE liner. Thereafter, 7.0467 g of a 20 wt. % TPAOH solution was added and the mixture stirred. Next, mother liquor from Example 1 (3.3018 g) was added and the mixture was kept under stirring. The silica source, (5.2413 g, Ludox HS-40, 40 wt. %), was added and the mixture stirred until homogeneous. The PTFE liner was positioned within an autoclave and transferred to an oven and heated to a temperature of 175° C. whilst rotating the autoclave. The autoclave was kept at isothermal conditions for 18 hrs. Thereafter, the product was centrifuged and the mother liquor decanted (pH 13 measured using a pH stick strip). Distilled water was added to the zeolite and the system re-dispersed using a shaker before centrifuging again. The system was repeated until the decanted solution approached pH 7. The zeolite was thereafter freeze-dried. The dry mass was 2.0771 g. As noted herein, X-ray diffraction identified the zeolite as ZSM-5.

Example 2 demonstrates that the mother liquor of Example 1, which utilized a neutralized WS-ODSO composition, can be recycled to produce zeolite in a subsequent synthesis, and further that no utility water was required nor any NaOH reagent was required across two batches. The only source of added alkaline agent (NaOH) is from the neutralized WS-ODSO composition of Reference Example 2.

Example 3: A zeolite was synthesized using mother liquor from Example 2 as a component, wherein mineralizer was from the mother liquor, in the absence of added mineralizer, and without added utility water. Aluminum nitrate nonahydrate (0.2632 g) was weighed into a 45 ml PTFE liner. Thereafter, 7.0463 g of a 20 wt. % TPAOH solution was added and the mixture stirred. Next, mother liquor from Example 2 (3.3003 g) was added and the mixture was kept under stirring. The silica source, (5.2428 g, Ludox HS-40, 40 wt. %), was added and the mixture stirred until homogeneous. The PTFE liner was positioned within an autoclave and transferred to an oven and heated to a temperature of 175° C. whilst rotating the autoclave. The autoclave was kept at isothermal conditions for 18 hrs. Thereafter, the product was centrifuged and the mother liquor decanted (pH 14 measured using a pH stick strip). Distilled water was added to the zeolite and the system re-dispersed using a shaker before centrifuging again. The system was repeated until the decanted solution approached pH 7. The zeolite was thereafter freeze-dried. The dry mass was 2.1034 g. As noted herein, X-ray diffraction identified the zeolite as ZSM-5.

Example 3 demonstrates that the mother liquor of Example 2, which utilized a recycled neutralized WS-ODSO composition, can be further recycled to produce zeolite in a further subsequent synthesis. In addition, no utility water was required nor any NaOH reagent was required across three batches. The only source of added alkaline agent (NaOH) is from the neutralized WS-ODSO composition of Reference Example 2, twice removed from Example 3.

Example 4: A zeolite was synthesized using mother liquor from Example 3 as a component, wherein mineralizer was from the mother liquor, in the absence of added mineralizer, and without added utility water. Aluminum nitrate nonahydrate (0.2633 g) was weighed into a 45 ml PTFE liner. Thereafter, 7.0466 g of a 20 wt. % TPAOH solution was added and the mixture stirred. Next, mother liquor from Example 3 (3.3006 g) was added and the mixture was kept under stirring. The silica source, (5.2430 g, Ludox HS-40, 40 wt. %), was added and the mixture stirred until homogeneous. The PTFE liner was positioned within an autoclave and transferred to an oven and heated to a temperature of 175° C. whilst rotating the autoclave. The autoclave was kept at isothermal conditions for 18 hrs. Thereafter, the product was centrifuged and the mother liquor decanted (pH 13 measured using a pH stick strip). Distilled water was added to the zeolite and the system re-dispersed using a shaker before centrifuging again. The system was repeated until the decanted solution approached pH 7. The zeolite was thereafter freeze-dried. The dry mass was 1.9019 g. As noted herein, X-ray diffraction identified the zeolite as ZSM-5.

Example 4 demonstrates that the mother liquor of Example 3, which utilized a twice recycled neutralized WS-ODSO composition, can be still further recycled to produce zeolite in a still further subsequent synthesis. In addition, no utility water was required nor any NaOH reagent was required across four batches. The only source of added alkaline agent (NaOH) is from the neutralized WS-ODSO composition of Reference Example 2, thrice removed from Example 3.

Figure 8:
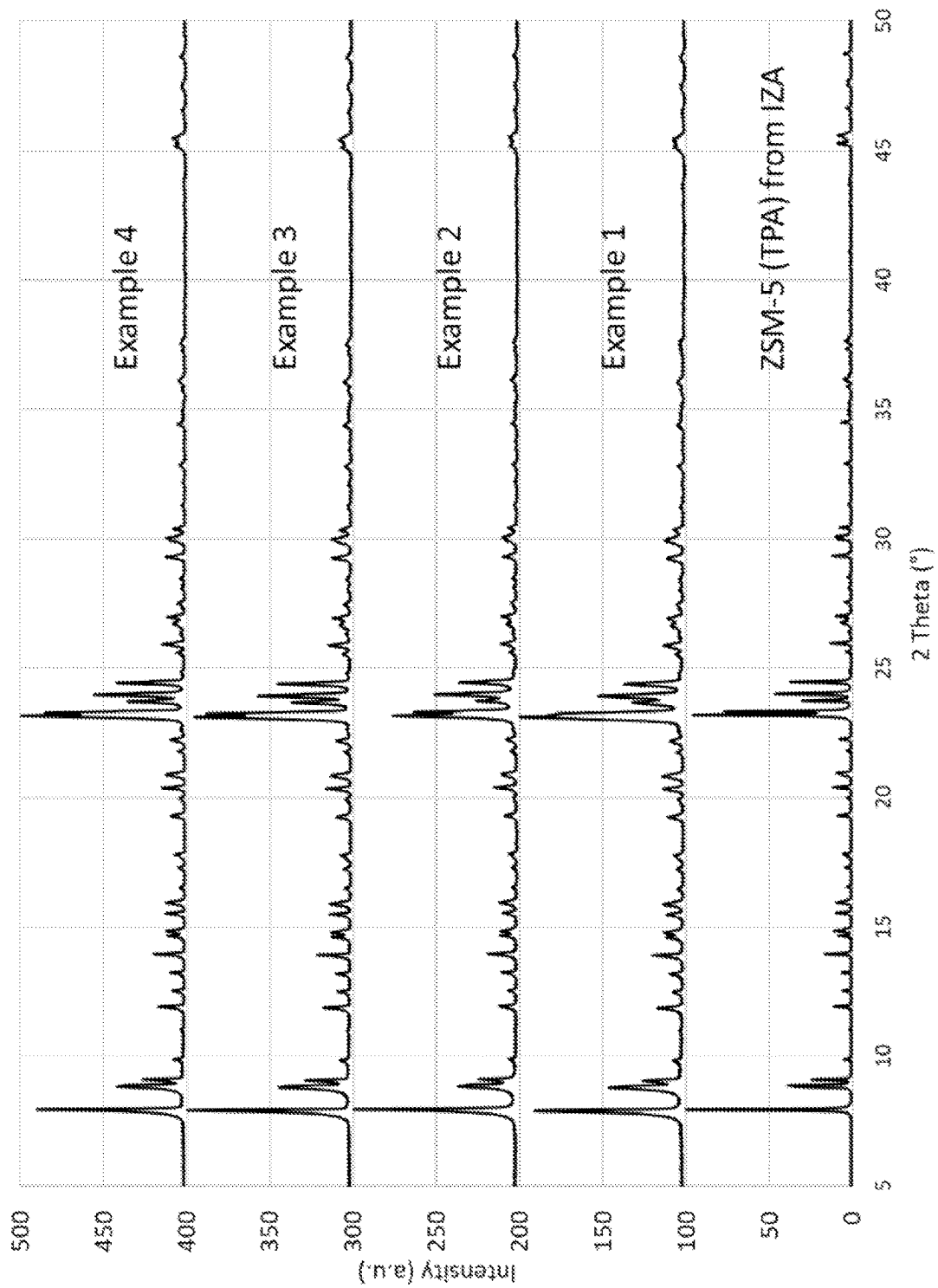
FIG. 8 shows X-ray diffraction patterns of zeolites synthesized in Example 1 and Example 2 herein, relative to reference X-ray diffraction patterns.

FIG. 8 shows the X-ray diffraction patterns of the as-made zeolites from Examples 1 to 4, also showing References to ZSM-5 synthesized with tetrapropylammonium cations from the International Zeolite Association (IZA). Each pattern is in arbitrary units (a.u.) and is offset on the y-axis by an equivalent amount, and where the X-ray diffraction patterns are normalized to the highest intensity peak, which are effective to compare patterns relative to one another. It is clear in all cases that well-defined ZSM-5 is produced by recycling the neutralized WS-ODSO. Hence, over multiple batches it is possible to use neutralized WS-ODSO (and the recycled mother liquors) as reagents in zeolite syntheses and thereby reduce the "free" utility water intended for zeolite synthesis by 100%, and also to reduce the NaOH reagent by 100%, since the neutralized WS-ODSO contains sufficient NaOH to act as a zeolite mineralizer over multiple batches.

The methods of preparing materials described above and characterized in the attached figures are exemplary, and process modifications and variations will be apparent to those of ordinary skill in the art and the scope of protection for the invention is to be defined by the claims that follow.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

TABLE 1

| ODSO Name | Formula | Structure Examples |
| --- | --- | --- |
| Dialkyl-sulfonesulfoxide Or 1,2-alkyl-alkyl-disulfane 1,1,2-trioxide | (R—SOO—SO—R') | 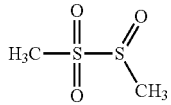<br>1,2-Dimethyldisulfane 1,1,2-trioxide |
| Dialkyl-disulfone Or 1,2 alkyl-alkyl-disulfane 1,1,2,2-tetraoxide | (R—SOO—SOO—R') | 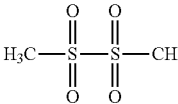<br>1,2-Dimethyldisulfane 1,1,2,2-tetraoxide |
| Alkyl-sulfoxidesulfonate | (R—SO—SOO—OH) | 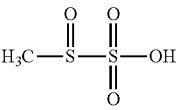<br>Methylsulfanesulfonic acid oxide |
| Alkyl-sulfonesulfonate | (R—SOO—SOO—OH) | 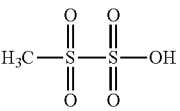<br>1-Hydroxy-2-methyldisulfane 1,1,2,2-tetraoxide |
| Alkyl-sulfoxidesulfinate | (R—SO—SO—OH) | 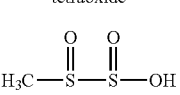<br>1-Hydroxy-2-methyldisulfane 1,2-dioxide |
| Alkyl-sulfonesulfinate | (R—SOO—SO—OH) | 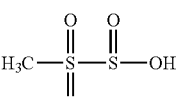<br>Methylsulfanesulfinic acid dioxide |

R and R' can be the same or different C1-C10 alkyl or C6-C10 aryl.

TABLE 2

|  | Na (wt. %) | S (wt. %) | W (wt. %) |
| --- | --- | --- | --- |
| WS-ODSO | 0.07 | 21.90 | 0.28 |
| Neutralized WS-ODSO (liquid) | 9.40 | 13.98 | 0.16 |
| Neutralized WS-ODSO (solid) | 27.14 | 24.59 | 0.12 |

What is claimed is:

1. A method for synthesis of a material comprising:
heating a homogeneous aqueous mixture of one or more water-soluble oxidized disulfide oil, WS-ODSO, compounds, and precursors and reagents of a first material, for a first synthesis of the first material, under conditions and for a time effective to form the first material as a first precipitate suspended in a first supernatant, wherein the first supernatant contains WS-ODSO compounds;

separating all or a portion of the first precipitate from the first supernatant; and using all or a portion of the first supernatant in a second synthesis of a same, similar or different type of material.

2. The method as in claim 1, wherein using all or a portion of the first supernatant in the second synthesis comprises:

forming a second homogeneous aqueous mixture of all or a portion of the first supernatant, and precursors and reagents of the second material for the second synthesis, and heating the second homogeneous aqueous mixture under conditions and for a time effective to form a second material as a second precipitate suspended in a second supernatant, wherein the second supernatant contains WS-ODSO compounds.

3. The method as in claim 2, further comprising adding make-up WS-ODSO with precursors and reagents for the second synthesis.

4. The method as in claim 3, wherein make-up WS-ODSO is acidic and provided in a composition with an alkaline agent as a pH-modified WS-ODSO.

5. The method as in claim 2, further comprising carrying out an Nth synthesis of a same, similar or different type of material, wherein N≥3, the wherein the Nth synthesis comprises: forming an Nth homogeneous aqueous mixture of all or a portion of the second supernatant if N=3, or all or a portion of an (N−1)th supernatant if N>3, and precursors and reagents for the Nth synthesis, and heating the Nth homogeneous aqueous mixture under conditions and for a time effective to form an Nth material as an Nth precipitate suspended in an Nth supernatant, wherein the Nth supernatant contains WS-ODSO compounds.

6. The method as in claim 5 wherein the Nth supernatant is used as a component in a subsequent (N+1)th synthesis.

7. The method as in claim 6, wherein the one or more WS-ODSO compounds are acidic and are provided in a composition with an alkaline agent as a pH-modified WS-ODSO composition, wherein precursors and reagents for the (N−1)th synthesis comprise a mineralizer, and wherein the (N−1)th supernatant comprises the alkaline agent as all or a portion of the mineralizer required for the Nth synthesis.

8. The method as in claim 7, wherein the (N−1)th supernatant serves as a portion of water required for the Nth synthesis or as all utility water required for the Nth synthesis.

9. The method as in claim 1, wherein the one or more WS-ODSO compounds are acidic and are provided in a composition with an alkaline agent as a pH-modified WS-ODSO composition.

10. The method as in claim 9, wherein the alkaline agent is selected from the group consisting of sodium hydroxide, potassium hydroxide, rubidium hydroxide, lithium hydroxide, cesium hydroxide, and combinations of one of the foregoing alkaline agents.

11. The method as in claim 1, wherein the one or more WS-ODSO compounds are provided as a pH-modified WS-ODSO composition of an acidic WS-ODSO composition and an alkaline agent, wherein second synthesis of the same, similar or different type of material includes precursors and reagents for the second synthesis, wherein precursors and reagents for the second synthesis comprise a mineralizer, and wherein the first supernatant comprises the alkaline agent as all or a portion of the mineralizer required for the second synthesis.

12. The method as in claim 11, wherein the first supernatant serves as a portion of water required for the second synthesis or as all utility water required for the second synthesis.

13. The method as in claim 1, wherein the one or more WS-ODSO compounds is selected from the group consisting of WS-ODSO compounds having the general formula (R–SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' can be the same or different C1-C10 alkyl or C6-C10 aryl.

14. The method as in claim 1, wherein the one or more WS-ODSO compounds comprises a mixture of two or more types of WS-ODSO compounds selected from the group consisting of WS-ODSO compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' can be the same or different C1-C10 alkyl or C6-C10 aryl.

15. The method as in claim 14, wherein the mixture is derived from oxidation of disulfide oil compounds present in an effluent refinery hydrocarbon stream recovered following catalytic oxidation of mercaptans present in a mercaptan-containing hydrocarbon stream.

16. A process for synthesis of a material comprising:
carrying out a first synthesis of a first material in the presence of one or more water-soluble oxidized disulfide oil, WS-ODSO, compounds to form the first material as a first precipitate suspended in a first supernatant, wherein the first supernatant contains WS-ODSO compounds;

separating all or a portion of the first precipitate from the first supernatant; and carrying out an Nth synthesis of a same, similar or different type of material, wherein N is an integer greater than or equal to 2, and wherein the Nth synthesis uses supernatant from an (N−X)th synthesis that contains WS-ODSO compounds, wherein X is an integer between 1 and (N−1).

17. The process as in claim 16, wherein the one or more WS-ODSO compounds are acidic and are provided in a composition with an alkaline agent as a pH modified WS-ODSO composition, wherein precursors and reagents for the (N−X)th synthesis comprise a mineralizer, and wherein the supernatant from an (N−X)th synthesis comprises the alkaline agent as all or a portion of the mineralizer required for the Nth synthesis.

18. The process as in claim 16, wherein the one or more WS-ODSO compounds are acidic and are provided in a composition with an alkaline agent as a pH-modified WS-ODSO composition, and wherein the supernatant from an (N−X)th synthesis comprises at least a portion of the water required for the Nth synthesis.

19. The process as in claim 16, wherein the material in the first and/or Nth syntheses comprise zeolites possessing MFI, FAU, *BEA, MOR, or CHA frameworks.

20. The process as in claim 16, wherein the material in the first and/or Nth syntheses comprises ZSM-5.

21. A process for synthesis of a material comprising:
carrying out a first synthesis of a first material in the presence of one or more water-soluble oxidized disulfide oil, WS-ODSO, compounds to form the first material as a first precipitate suspended in a first supernatant;

separating all or a portion of the first precipitate from the first supernatant; and carrying out an Nth synthesis of a same, similar or different type of material, wherein N is an integer greater than or equal to 2, and wherein the Nth synthesis uses supernatant from an (N−X)th synthesis, wherein X is an integer between 1 and (N−1), wherein the material in the first and/or Nth syntheses comprises amorphous inorganic oxide material, mesoporous inorganic oxide material, metal oxide material, crystalline inorganic oxide material, zeolite, crystalline silico-alumino-phosphate material, alumino-phosphate material or metal alumino-phosphate material.

22. The process as in claim 21, wherein the material in the first and/or Nth syntheses comprises zeolite.

23. The process as in claim 22, wherein the material in the first and/or Nth syntheses comprises zeolite possessing MFI, FAU, *BEA, MOR, or CHA frameworks.

24. The process as in claim 23, wherein the material in the first and/or Nth syntheses comprises ZSM-5 zeolite possessing MFI framework.

25. A process for synthesis of a material comprising:

carrying out a first synthesis of a first material in the presence of one or more water-soluble oxidized disulfide oil, WS-ODSO, compounds to form the first material as a first precipitate suspended in a first supernatant, wherein the one or more WS-ODSO compounds are derived from oxidation of disulfide oil compounds present in an effluent refinery hydrocarbon stream recovered following catalytic oxidation of mercaptans present in a mercaptan-containing hydrocarbon stream;

separating all or a portion of the first precipitate from the first supernatant; and carrying out an Nth synthesis of a same, similar or different type of material, wherein N is an integer greater than or equal to 2, and wherein the Nth synthesis uses supernatant from an (N−X)th synthesis, wherein X is an integer between 1 and (N−1).

26. A process for synthesis of a material comprising:

carrying out a first synthesis of a first material in the presence of one or more water-soluble oxidized disulfide oil, WS-ODSO, compounds to form the first material as a first precipitate suspended in a first supernatant, wherein the one or more WS-ODSO compounds is selected from the group consisting of WS-ODSO compounds having the general formula (R—SOO—SO—R'), (R—SOO—SOO—R'), (R—SO—SOO—OH), (R—SOO—SOO—H), (R—SOO—SO—OH), (R'—SO—SO—OR), (R'—SOO—SO—OR), (R'—SO—SOO—OR) and (R'—SOO—SOO—OR), wherein R and R' can be the same or different C1-C10 alkyl or C6-C10 aryl;

separating all or a portion of the first precipitate from the first supernatant; and carrying out an Nth synthesis of a same, similar or different type of material, wherein N is an integer greater than or equal to 2, and wherein the Nth synthesis uses supernatant from an (N−X)th synthesis, wherein X is an integer between 1 and (N−1).

27. The process as in claim 26, wherein the one or more WS-ODSO compounds comprises a mixture of two or more types of WS-ODSO compounds selected from the group consisting of WS-ODSO compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' can be the same or different C1-C10 alkyl or C6-C10 aryl.

28. A process for synthesis of a material comprising:

carrying out a first synthesis of a first material in the presence of one or more water-soluble oxidized disulfide oil, WS-ODSO, compounds to form the first material as a first precipitate suspended in a first supernatant, wherein the one or more WS-ODSO compounds are acidic and are provided in a composition with an alkaline agent as a pH-modified WS-ODSO composition;

separating all or a portion of the first precipitate from the first supernatant; and carrying out an Nth synthesis of a same, similar or different type of material, wherein N is an integer greater than or equal to 2, and wherein the Nth synthesis uses supernatant from an (N−X)th synthesis, wherein X is an integer between 1 and (N−1), wherein precursors and reagents for the (N−X)th synthesis comprise a mineralizer, and wherein the supernatant from an (N−X)th synthesis comprises the alkaline agent from the pH-modified WS-ODSO composition as all or a portion of the mineralizer required for the Nth synthesis.

* * * * *